United States Patent [19]

Enomoto et al.

[11] Patent Number: 5,105,516
[45] Date of Patent: Apr. 21, 1992

[54] APPARATUS FOR ASSEMBLING CATALYTIC CONVERTER

[75] Inventors: Masayuki Enomoto; Kiyoshi Gondai; Sachihiro Yamashita; Mitsuki Nakamura, all of Saitama, Japan

[73] Assignee: Honda Giken Kogyo Kabushiki Kaisha, Tokyo, Japan

[21] Appl. No.: 559,767

[22] Filed: Jul. 30, 1990

[30] Foreign Application Priority Data

Mar. 23, 1989 [JP] Japan .................. 1-216945
Aug. 1, 1989 [JP] Japan .................. 1-199820

[51] Int. Cl.⁵ .............................................. B25B 27/14
[52] U.S. Cl. ................................... 29/281.5; 29/890; 228/6.1
[58] Field of Search .............. 29/801, 902, 890, 281.1, 29/281.4, 281.5; 228/6.1, 49.1

[56] References Cited

U.S. PATENT DOCUMENTS

| | | | |
|---|---|---|---|
| 3,761,005 | 9/1973 | Baxter et al. | 228/6.1 X |
| 4,146,162 | 3/1979 | Skakunov | 228/6.1 |
| 4,207,661 | 6/1980 | Mase et al. | 29/890 |
| 4,208,374 | 6/1980 | Foster | 29/890 |
| 4,373,983 | 2/1983 | Walter | 29/801 X |
| 4,400,860 | 8/1983 | Nonnenmann et al. | 29/890 |
| 4,413,392 | 11/1983 | Otani et al. | 29/890 |
| 4,768,272 | 9/1988 | Weaver et al. | 29/281.5 |
| 4,856,701 | 8/1989 | Pöckl | 228/6.1 |

FOREIGN PATENT DOCUMENTS 1406704 9/1975 United Kingdom .

Primary Examiner—Timothy V. Eley
Assistant Examiner—C. Richard Martin
Attorney, Agent, or Firm—Armstrong & Kubovcik

[57] ABSTRACT

An apparatus for assembling a catalytic converter, comprising a casing assembling device which includes a stationary receiving stand onto which one of the casing halves is placed with its inner surface directed upwardly, a positioning member movable between a position in which an end face of the catalyst abuts against the positioning member within the casing on the stationary receiving stand and a position outside of the casing, a lift bearer capable of holding the other casing half with its inner surface directed downwardly and liftable above the stationary receiving stand, and welding machines disposed on opposite sides of the stationary receiving stand.

3 Claims, 31 Drawing Sheets

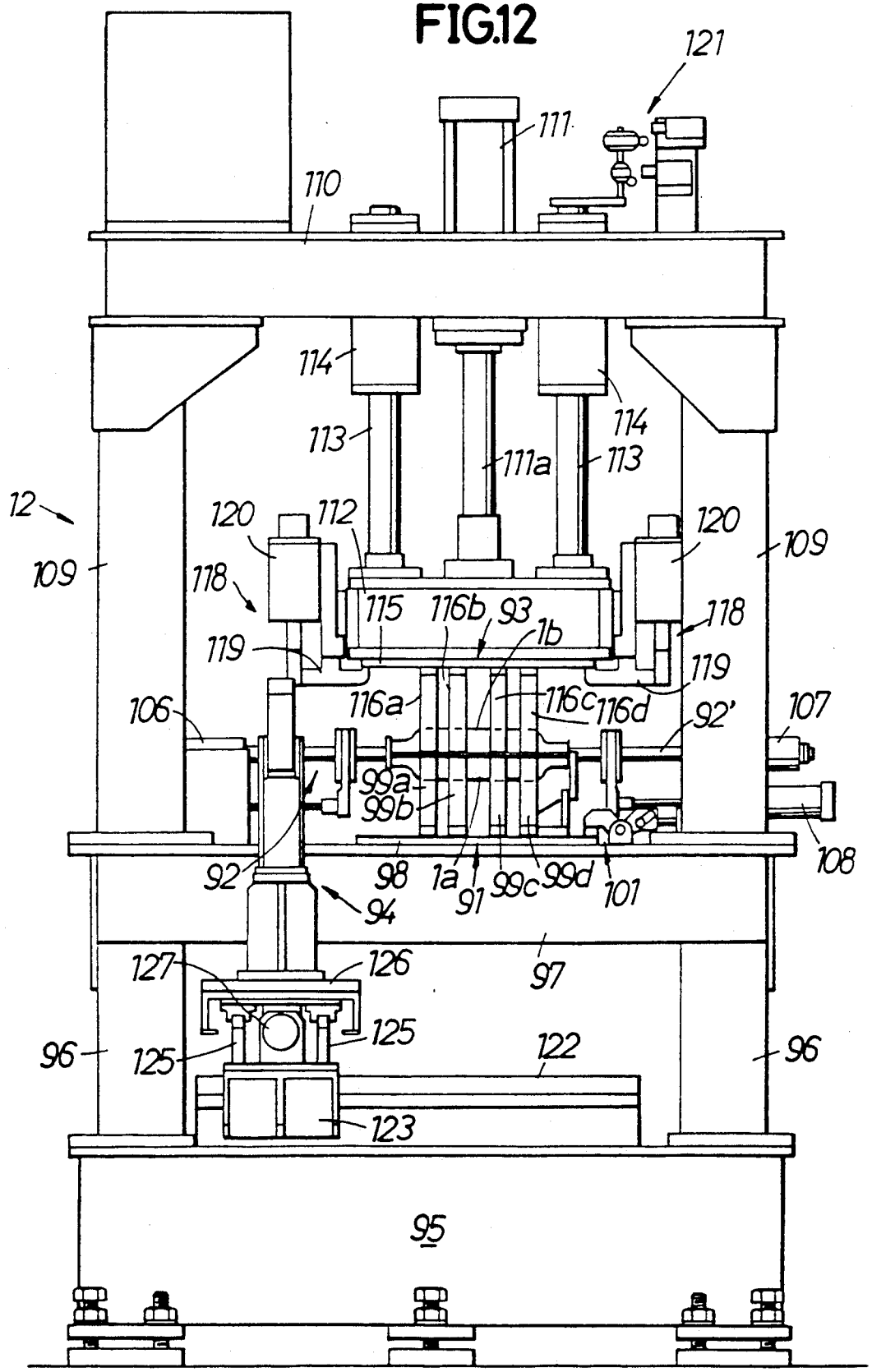

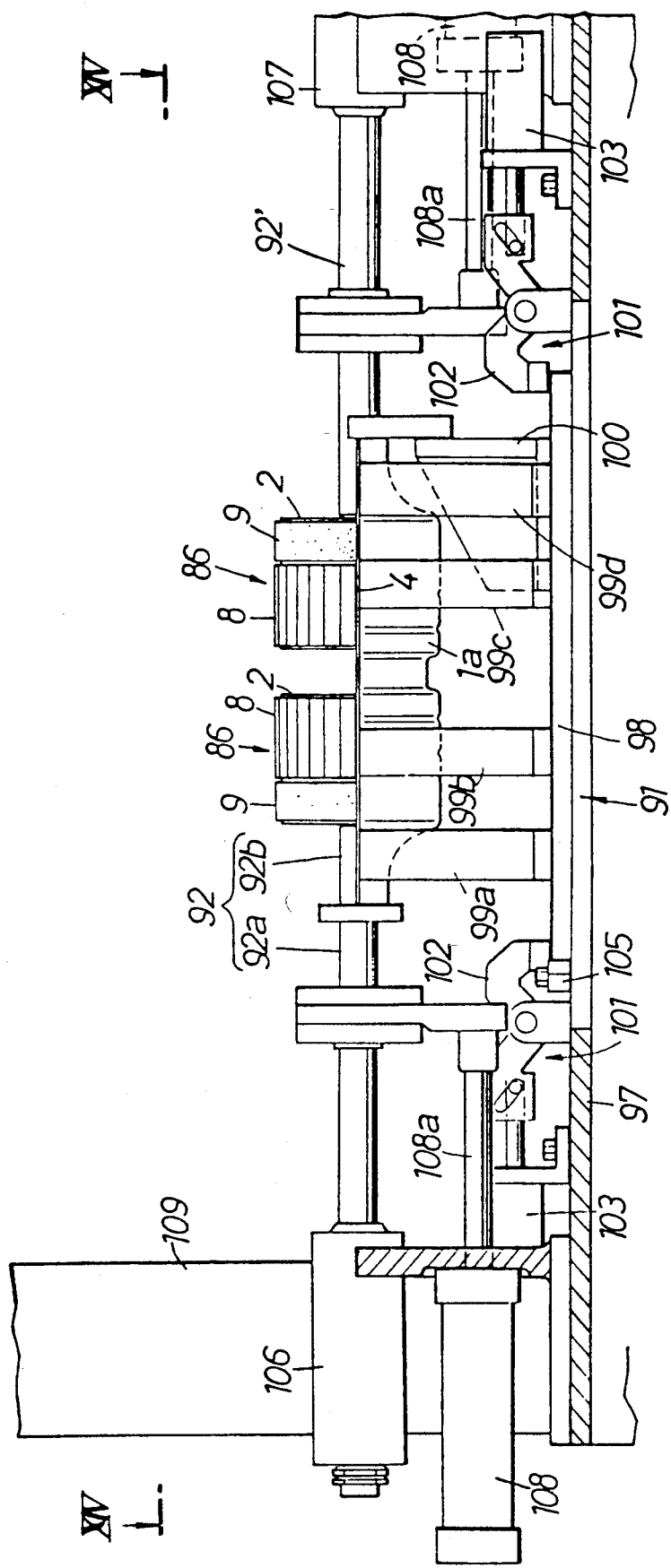

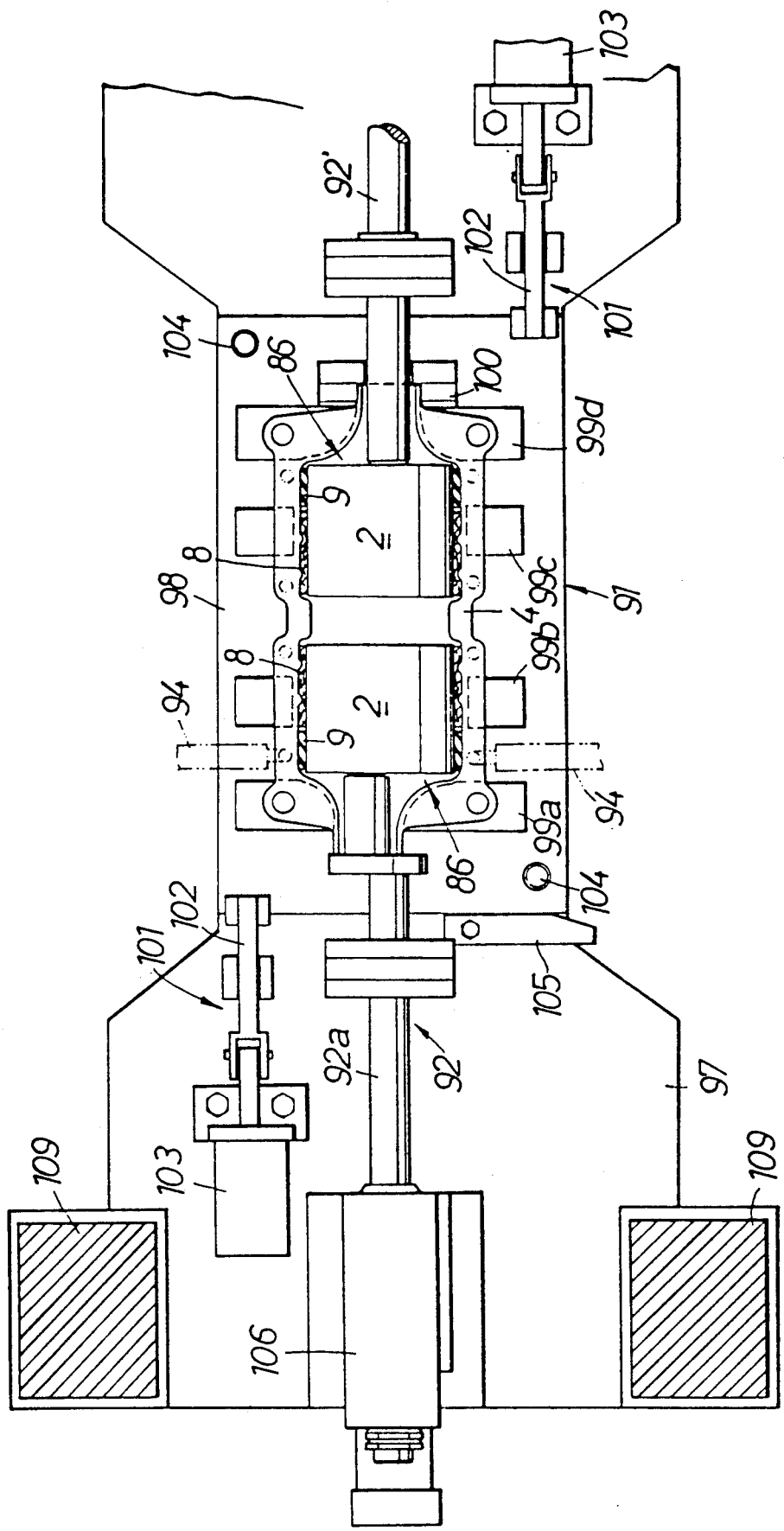

APPARATUS FOR ASSEMBLING CATALYTIC CONVERTER

BACKGROUND OF THE INVENTION

1. Field of the Invention

The field of the invention is a process and apparatus for assembling a catalytic converter which includes a columnar catalyst contained in a cylindrical casing with a seal member and a peripheral surface protecting member interposed between the catalyst and an inner surface of the casing, the casing comprising a pair of axially divided casing halves welded to each other and including flanges welded to opposite ends thereof.

2. Description of the Prior Art

Assembling of such catalytic converter has been conventionally conducted in such a manner that a vessel such as pallet and container is disposed for every plurality of assembling steps, and parts or components are transported for every lot.

In such prior art assembling, it is impossible to precisely seize the total assembling speed and the assembling situations and it is difficult to control the steps, resulting in a non-uniform quality of products.

In assembling the casing, as disclosed in Japanese Patent Application Laid-open Nos. 173516/82; 247814/86 and 1248/88, a plurality of parts or components including a catalyst to be contained in the casing are disposed in a stack, and a pair of casing halves are placed one on the other from opposite sides of the stack and coupled to each other. Therefore, it is difficult to position within the casing the plurality of parts or components including the catalyst, and the assembling apparatus is of a complicated construction.

Further, the welding of flanges to the opposite ends of the casing with the catalyst packed therein is commonly conducted by a manual operation by a welding worker. The flanges at the opposite ends of the casing in the catalytic converter may be coupled to the casing with their axes offset from each other, for example, due to a limitation by the position of mounting to a vehicle or the like, and the relative positions of the flanges to the casing may be displaced from each other. In such welding operation of the flanges to the casing, not only the skill is required, but also aligning is complicated and the operation efficiency is inferior.

SUMMARY OF THE INVENTION

Therefore, it is an object of the present invention to provide a process and apparatus for assembling a catalytic converter, wherein the above problems are overcome.

To achieve the above object, according to a first aspect of the present invention, there is proposed a process for assembling a catalytic converter, comprising an insert component assembling step of wrapping a seal member and a peripheral surface protecting member around catalyst to prepare an insert component assembly for insertion into a casing; a casing assembling step of disposing a pair of casing halves with their inner surfaces opposed to each other, positioning and disposing the insert component assembly within one of the casing halves and in this condition, bringing the other casing half close to the one casing half to weld the weld portions of the casing halves; and a flange welding step of fitting flanges over opposite ends of the casing disposed vertically while positioning them, and then welding the opposite ends of the casing and the flanges to each other while rotating the casing through 180 degree about a horizontal axis thereof to bring fitted portions of the opposite ends of the casing and the flanges to substantially the same position, the above steps being carried out in the mentioned order consecutively.

With such process, the catalytic converter can be efficiently assembled by sequentially conducting the insert component assembling step of preparing the insert component assembly, the casing assembling step of assembling the casing with the insert component assembly contained therein, and the flange welding step of fitting the flanges at the opposite ends of the casing while positioning them and then welding each of the flanges to corresponding one of the opposite ends of the casing in such fitted condition. Thus, a consistent assembling can be performed, leading to a facilitated control of steps.

In addition, according to a second aspect of the present invention, there is proposed an apparatus for assembling a catalytic converter, comprising a casing assembling device which includes a stationary receiving stand onto which one of casing halves is placed with its inner surface directed upwardly, a positioning member movable between a position in which an end face of the catalyst abut against the positioning member within the casing on the stationary receiving stand and a position outside of the casing, a lift bearer capable of holding the other casing half with its inner surface directed downwardly and liftable above the stationary receiving stand, and welding machine disposed on opposite sides of the stationary receiving stand.

With such construction, in a condition of one of the casing halves placed on the stationary receiving stand, the catalyst with the peripheral surface protecting member and the sealing member wrapped therearound can be positioned and disposed within such casing half, and the other casing half held by the lift bearer can be lowered by lowering the lift bearer and joined to the one casing. In this condition, the positioning member is moved out of the casing half and thereafter, casing halves can be welded to each other by welding machines. In a condition in which the catalysts are contained in a fixed position within the casing halves with the peripheral surface protecting member and seal member interposed between the catalyst and inner surfaces of the casing halves, the casing halves are welded to each other to complete the assembling of the casing. Thus, it is possible to facilitate and insure the assembling of the casing.

According to a third aspect of the present invention, there is proposed an apparatus for assembling a catalytic converter comprising a flange welding device including a support stand disposed in a fixed position and having a mounting position and a welding position established around the fixed position, a base carried on the support stand for angular displacement about a vertical axis so that a circumferential specific location can be moved between positions respectively corresponding to the mounting and welding positions, a turn table carried at the specific location for angular displacement about a horizontal axis, a support plate fixed to the turn table, a first holding means fixedly disposed on the support plate to position and hold the flanges to be welded to one end of the casing, a second holding means carried on the support plate for movement toward and away from the first holding means in a position opposed to the first holding means to position and hold the flanges to be welded to the other end of the casing, a clamp means provided on the support plate to detachably hold the casing having one end fitted in the flanges held by the first holding means.

With the above construction, in a condition in which the turn table has been located in the mounting position and the second holding means has been moved away from the first holding means, the fanges are positioned and held on the first and second holding means, respectively and further, if the second holding means is moved toward the first holding means in a condition in which the casing having one end fitted in the flange held by the first holding means has been clamped by the clamp means, the flanges are brought into their fitted states over the opposite ends of the casing in a predetermined relative position. Then, the base is angularly displaced about the vertical axis to move the turn table to the welding position where one of the flanges is welded to one end of the casing. Thereafter, the turn table is rotated through 180 degree to weld the other flange to the other end of the casing, thus completing the welding of the flanges to the opposite ends of the casing. Then, the base is angularly displaced to move the turn table to the mounting position, and thereafter, the second holding means is moved away from the first holding means. Further, the clamping by the clamp means is released, whereby the catalytic converter after completion of the welding can be removed. Accordingly, it is possible to easily conduct the positioning and holding of the flanges to the opposite ends of the casing and moreover to carry out the welding at the substantially same position, leading to an increased efficiency of operation.

The above and other objects, features and advantages of the invention will become apparent from a reading of the following description of the preferred embodiment, taken in conjunction with the accompanying drawings.

BRIEF DESCRIPTION OF THE DRAWINGS

Drawings illustrate one embodiment of the present invention, wherein

FIGS. 4 to 10 illustrate an insert component assembling device, wherein

FIG. 4 is a side view of the insert component assembling device;

FIG. 5 is a plan view of the insert component assembling device shown in FIG. 4;

FIG. 6 is an enlarged sectional view taken along a line VI—VI in FIG. 5;

FIG. 7 is a plan view of FIG. 6;

FIG. 8 is an enlarged sectional view taken along a line VIII—VIII in FIG. 7;

FIG. 9 is an enlarged sectional view taken along a line IX—IX in FIG. 5;

FIG. 10 is a plan view of FIG. 9;

FIGS. 11 to 15D illustrate a casing temporarily welding device, wherein

FIG. 11 is a front view of the casing temporarily welding device;

FIG. 12 is a side view taken along an arrow XII in FIG. 11;

FIG. 13 is an enlarged view of essential portions shown in FIG. 12 with a casing half placed on a stationary receiving stand;

FIG. 14 is a sectional view taken along a line XIV—XIV in FIG. 13;

FIGS. 15A, 15B, 15C and 15D are views for illustrating assembling stages in sequence;

FIGS. 17 to 20 illustrate a flange welding device, wherein

FIG. 17 is a front view in longitudinal section of the flange welding device;

FIG. 18 is a sectional view taken along a line XVIII—XVIII in FIG. 17;

FIG. 19 is a sectional view taken along a line XIX—XIX in FIG. 17;

FIG. 20 is a sectional view taken along a line XX—XX in FIG. 17;

FIGS. 21 to 23 illustrate an air-tightness inspecting device, wherein

FIG. 21 is a front view of the air-tightness inspecting device;

FIG. 22 is a view taken along an arrow XXII in FIG. 21;

FIG. 23 is a partially cataway side view taken as viewed in the same direction as in FIG. 22, with the catalytic converter submerged in water;

FIGS. 24 to 28 illustrate a stamping device, wherein

FIG. 24 is a front view in longitudinal section of the stamping device;

FIG. 25 is a sectional view taken along a line XXV—XXV in FIG. 24;

FIG. 26 is an enlarged sectional view of essential portions shown in FIG. 24;

FIG. 27 is a sectional view taken along a line XXVII—XXVII in FIG. 26; and

FIG. 28 is a sectional view illustrating an operative condition different from FIG. 26.

DESCRIPTION OF THE PREFERRED EMBODIMENT

The present invention will now be described by way of one embodiment with reference to the accompanying drawings.

Figure 1:
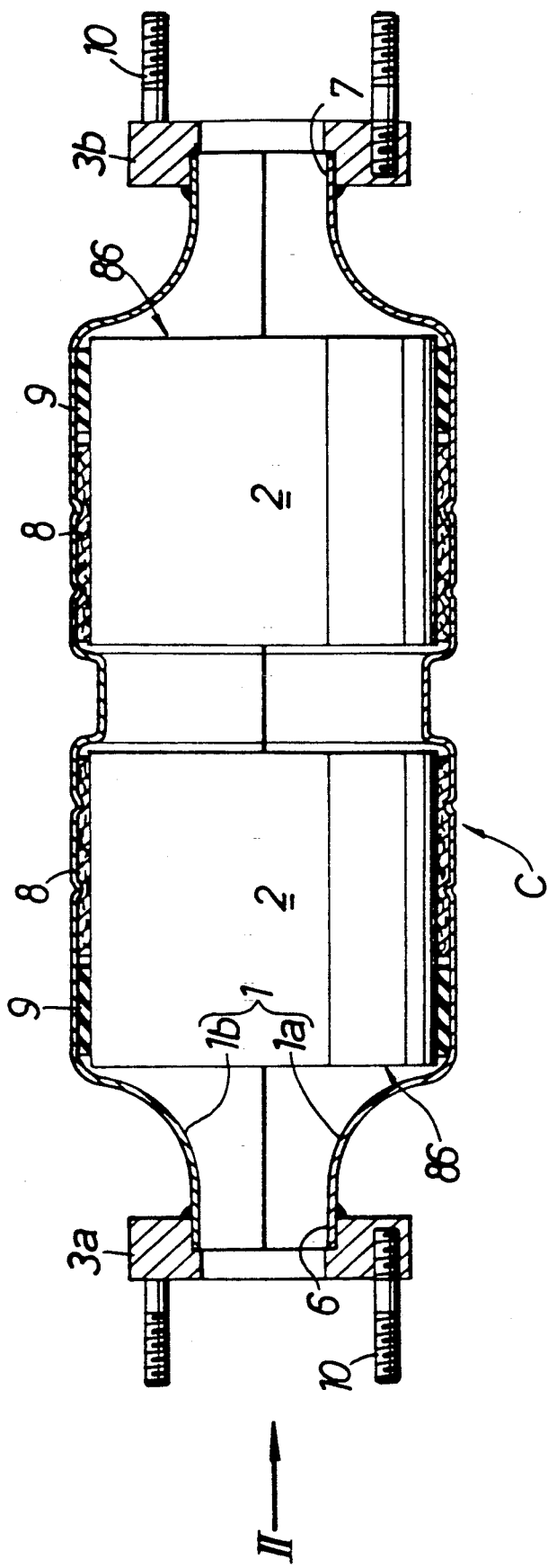
FIG. 1 is a longitudinal sectional view of a catalytic converter for a vehicle.
Figure 2:
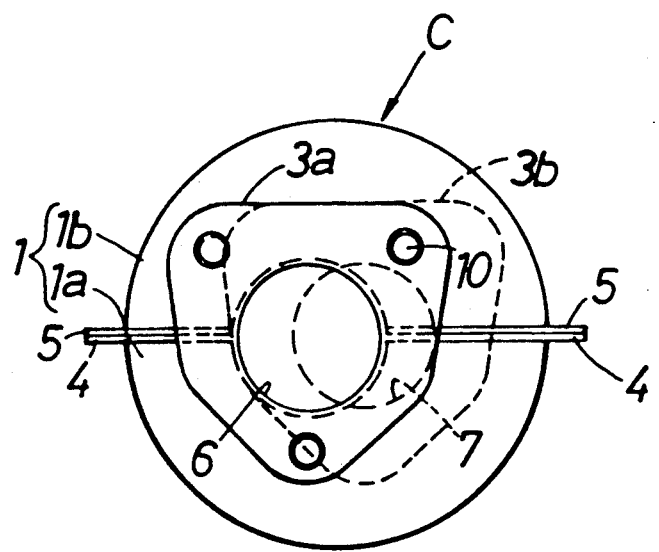
FIG. 2 is a view taken along an arrow II of FIG. 1.

FIGS. 1 and 2 illustrate a catalytic converter for a vehicle. The catalytic converter C is disposed midway of an exhaust system of an internal combustion engine for a vehicle and adapted to remove noxious components such as HC, CO and $NO_x$ in an exhaust gas as a result of flowing of the exhaust gas through a pair of catalysts 2, 2 contained in a casing 1 by oxidizing and promoting reduction reaction.

The casing 1 is basically cylindrically-shaped and has flanges 3a and 3b welded respectively to opposite ends thereof for joining the casing to an intermediate portion of an exhaust pipe. The casing 1 is comprised of a pair of casing halves 1a and 1b divided axially over the entire length thereof and welded to each other. The casing halves 1a and 1b are provided, at their circumferentially opposite ends, with joining collars 4 and 5 abutting against each other. The casing 1 is formed by placing the joning collars 4 and 5 into abutment against each other and welding them to each other. Moreover, the opposite ends of the casing 1 are formed so that each of them is narrower at an outer portion thereof. Openings 6 and 7 are provided at the narrowest portions of the opposite ends and have axes offset from each other.

The catalysts 2, 2 are columnarly-shaped to permit flowing of a gas, and seals 9, 9 are interposed between the catalysts 2, 2 and the casing 1. A peripheral surface protecting member 8 is formed into a ring-like shape, for example, by braiding fine wires of a stainless steel into a mesh form and functions to prevent the fracture of the catalyst 2 due to a vibration. The seal member 9 is also formed into a ring-like shape and functions to block flowing of the gas between the catalyst 2 and the casing 1.

It should be noted that the flanges 3a and 3b are substantially pentagonally-shaped, and for example, three bolts 10 are embedded in each of the flanges 3a and 3b to connect the flange to the exhaust pipe.

Figure 3:
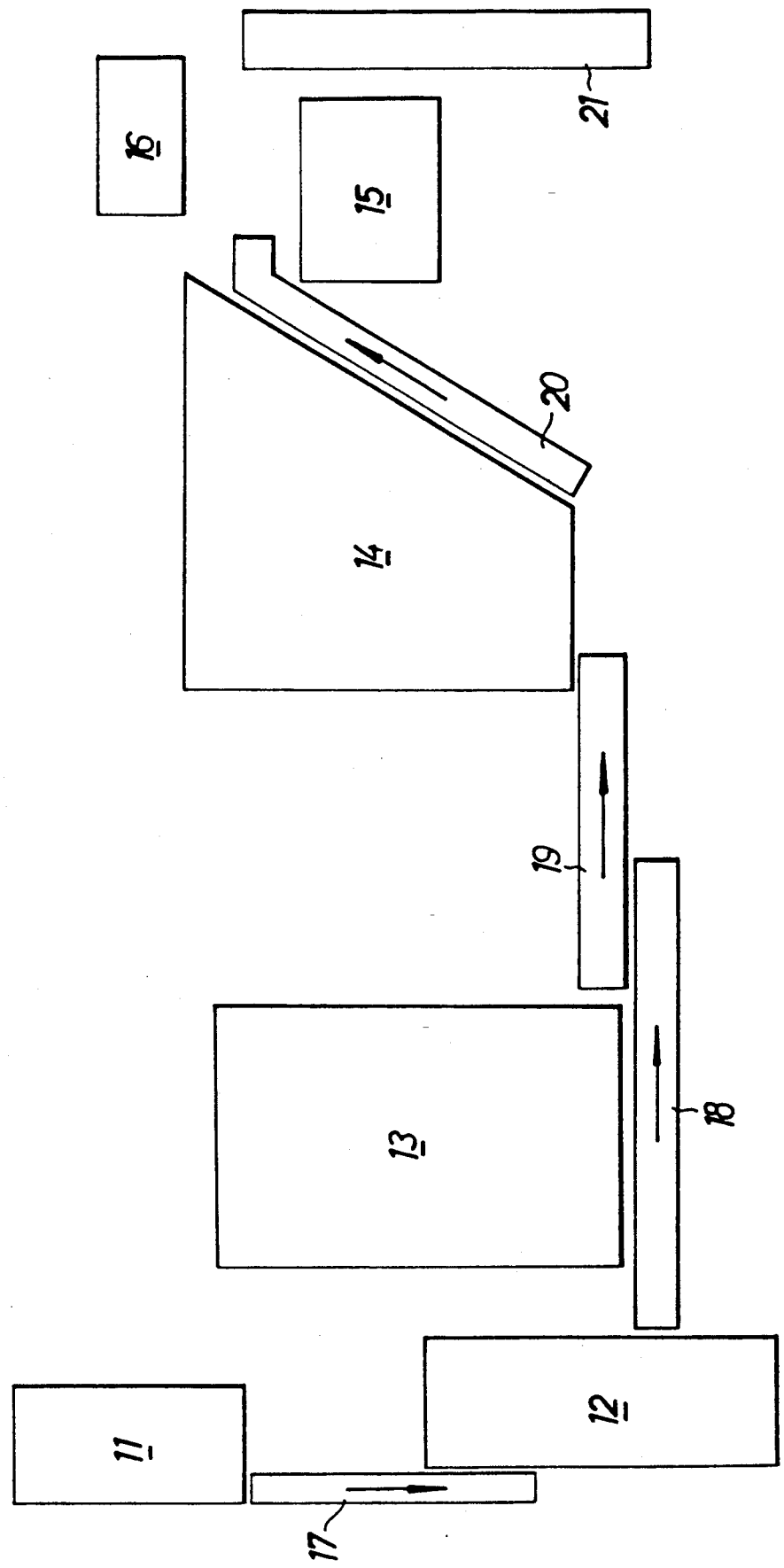
FIG. 3 is a diagram illustrating the arrangement of the entire apparatus.

Such a catalytic converter C is assembled by an assembling apparatus whose entire arrangement is shown in FIG. 3. The assembling apparatus comprises an insert component assembling device 11, a casing temporarily welding device 12, a casing welding device 13, a flange welding device 14, an air-tightness inspecting device 15 and a marking device 16, as well as a first transporting device 17 provided to extend between the insert component assembling device 11 and the casing temporarily-welding device 12, a second transporting device 18 provided to extend between the casing temporarily-welding device 12 and the casing welding device 13, a third transporting device 19 provided to extend between the casing welding device 13 and the flange welding device 14, a fourth transporting device 20 provided to extend between the flange welding device 14 and the air-tightness inspecting device 15, and a fifth transporting device 21 connected to the marking device 16.

Each of the first, third, fourth and fifth transporting devcices 17, 19, 20 and 21 is a belt conveyer, and the second transporting device 18 is arranged to transport the casing 1 from the casing temporarily-welding device 12 to the casing welding device 13 while varying its position.

Figure 4:
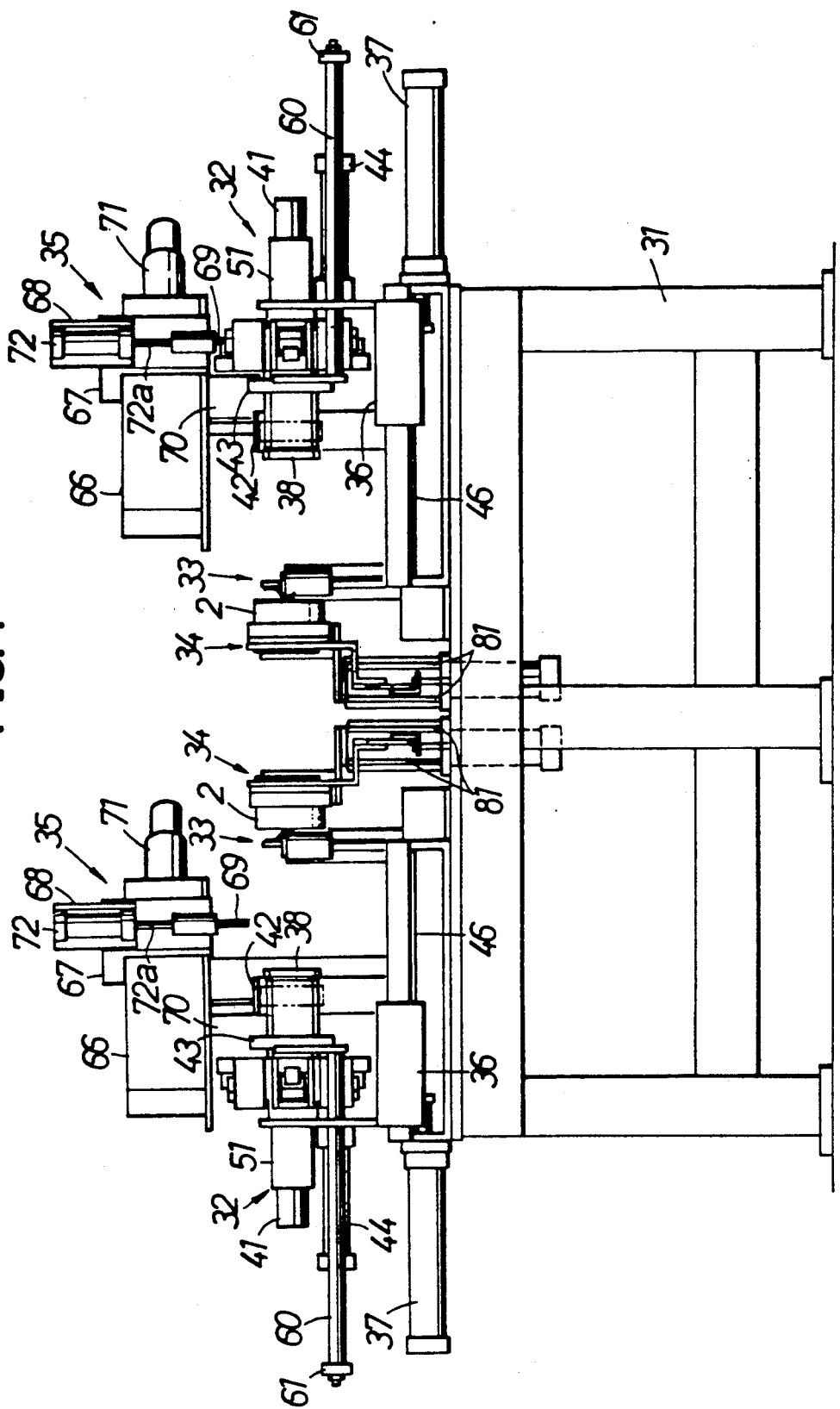
Figure 5:
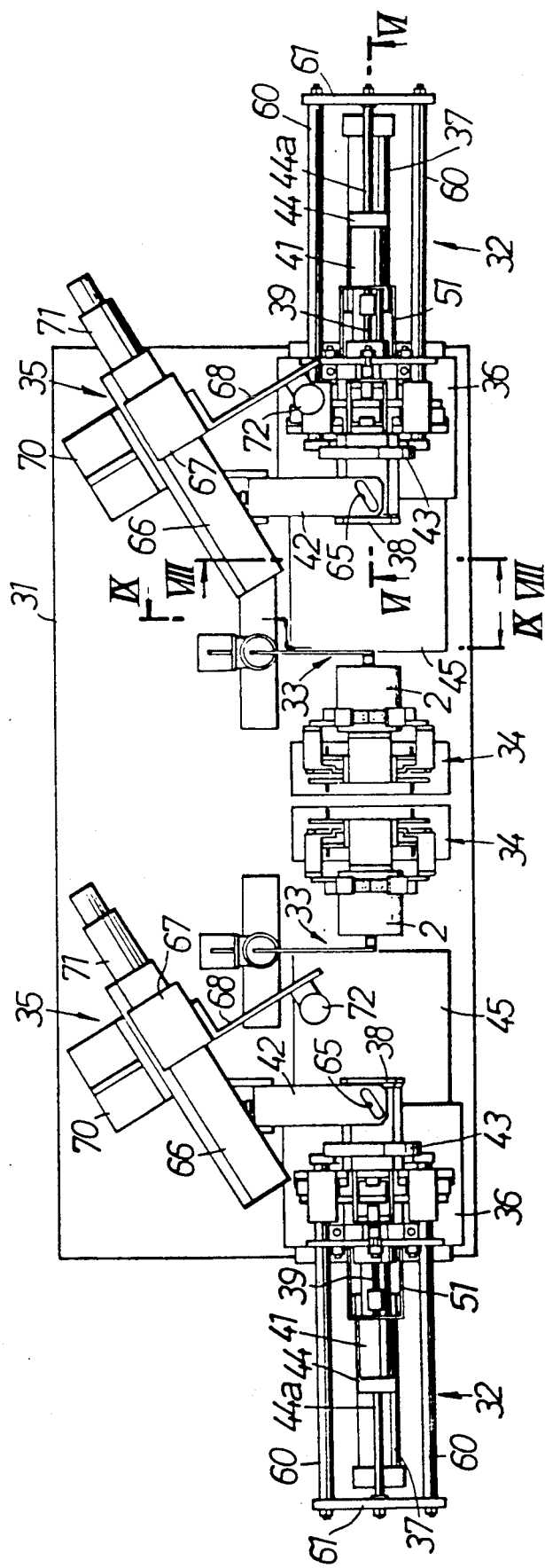
Figure 6:
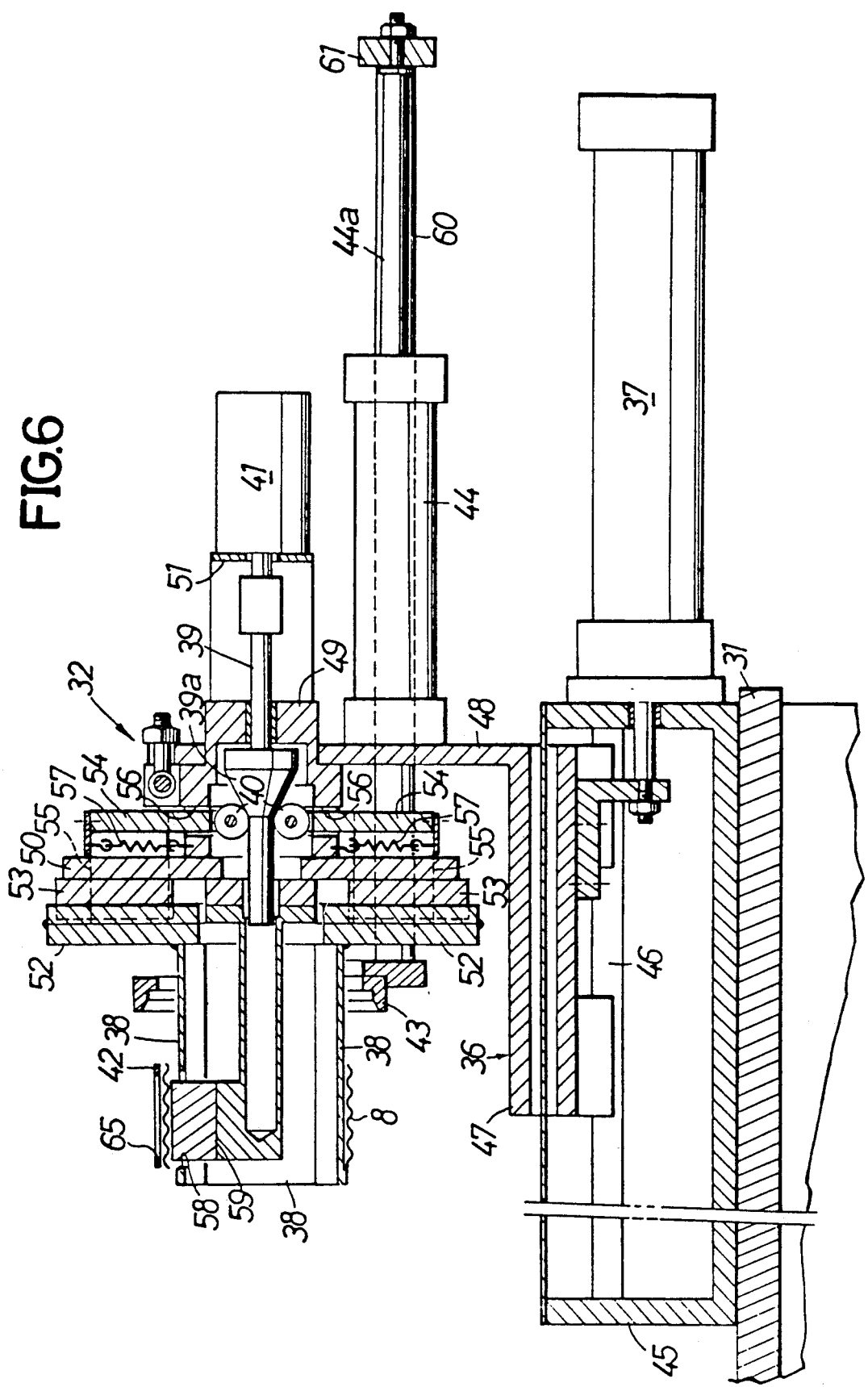
Figure 7:
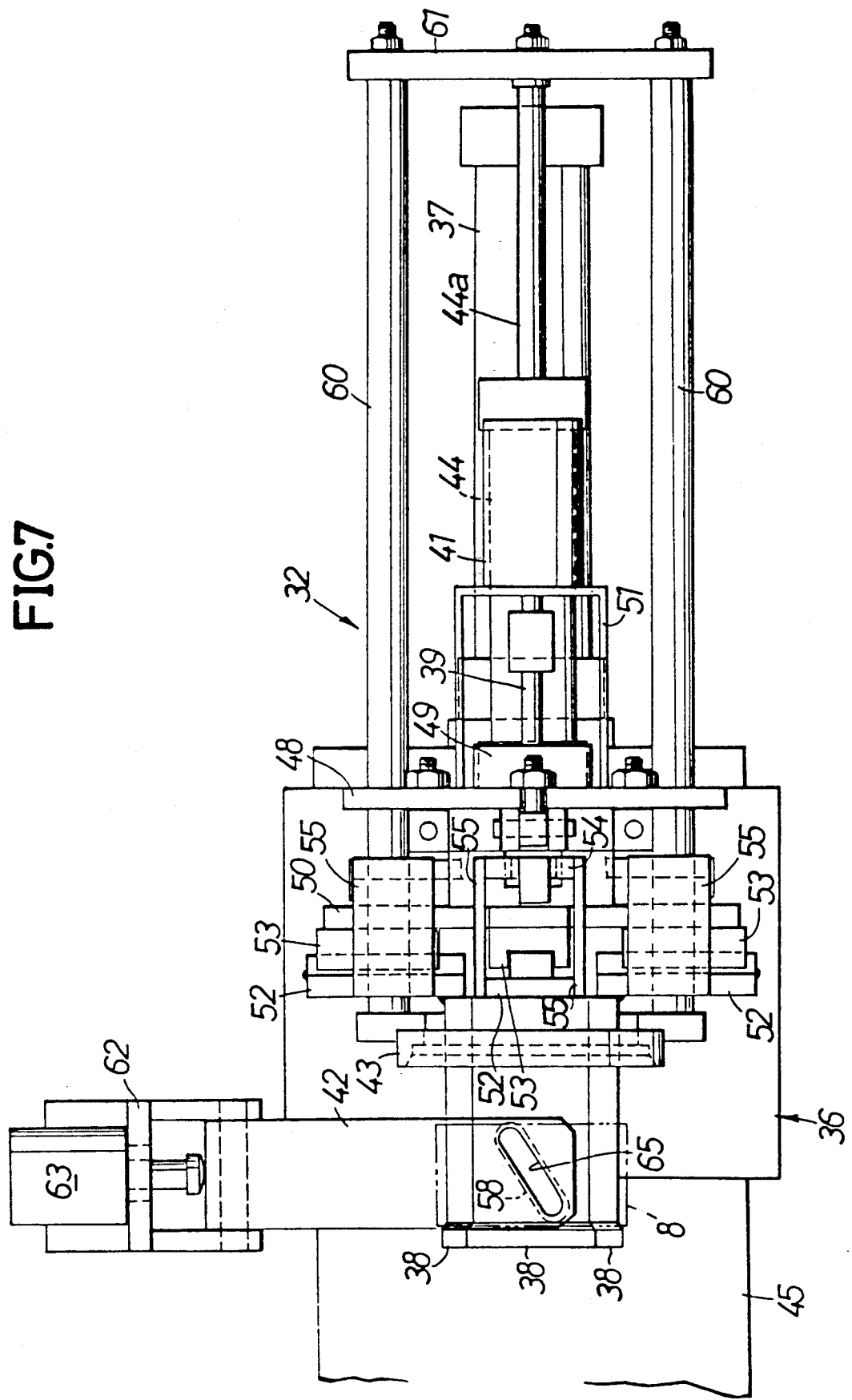
Figure 8:
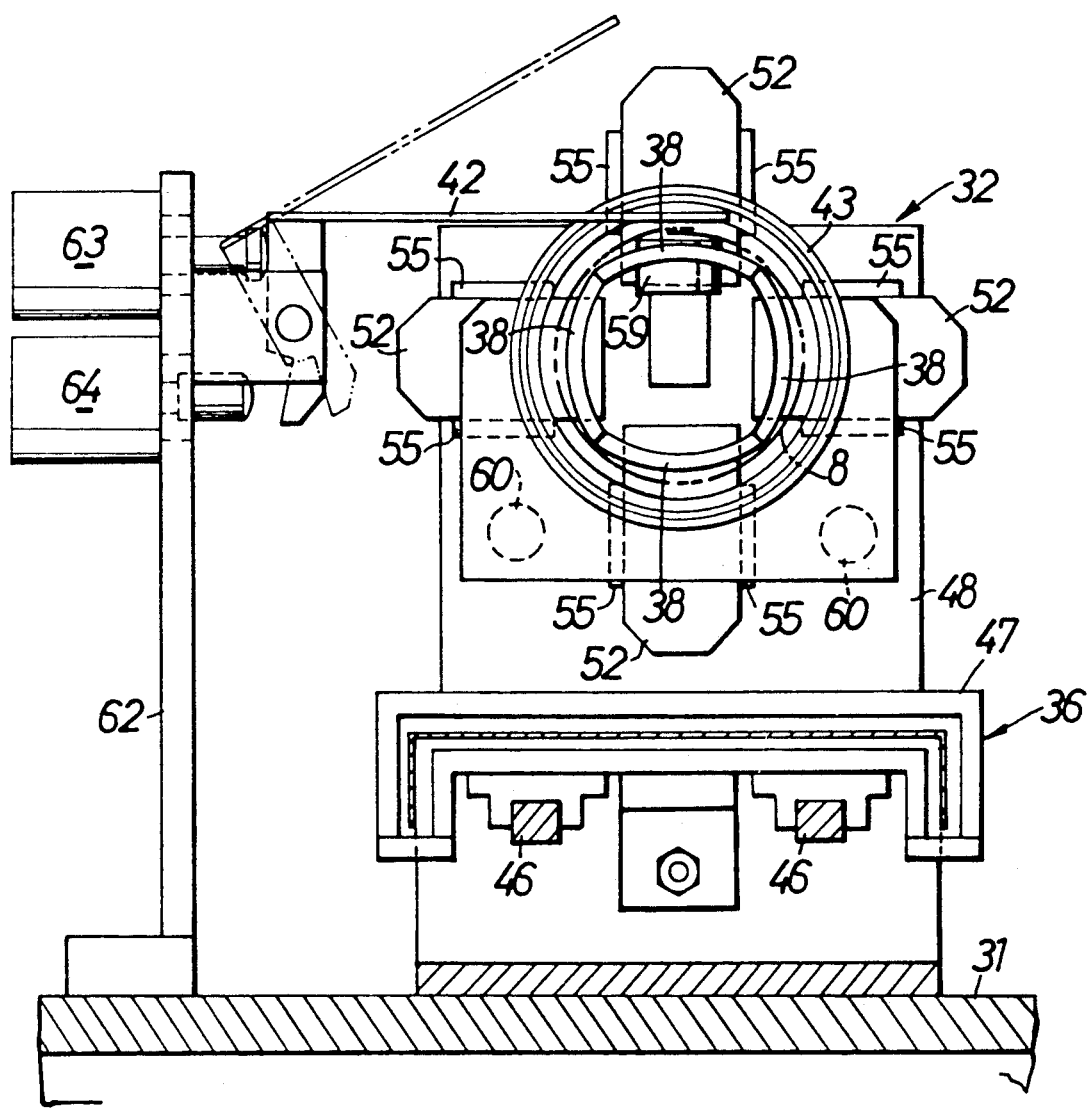
Figure 9:
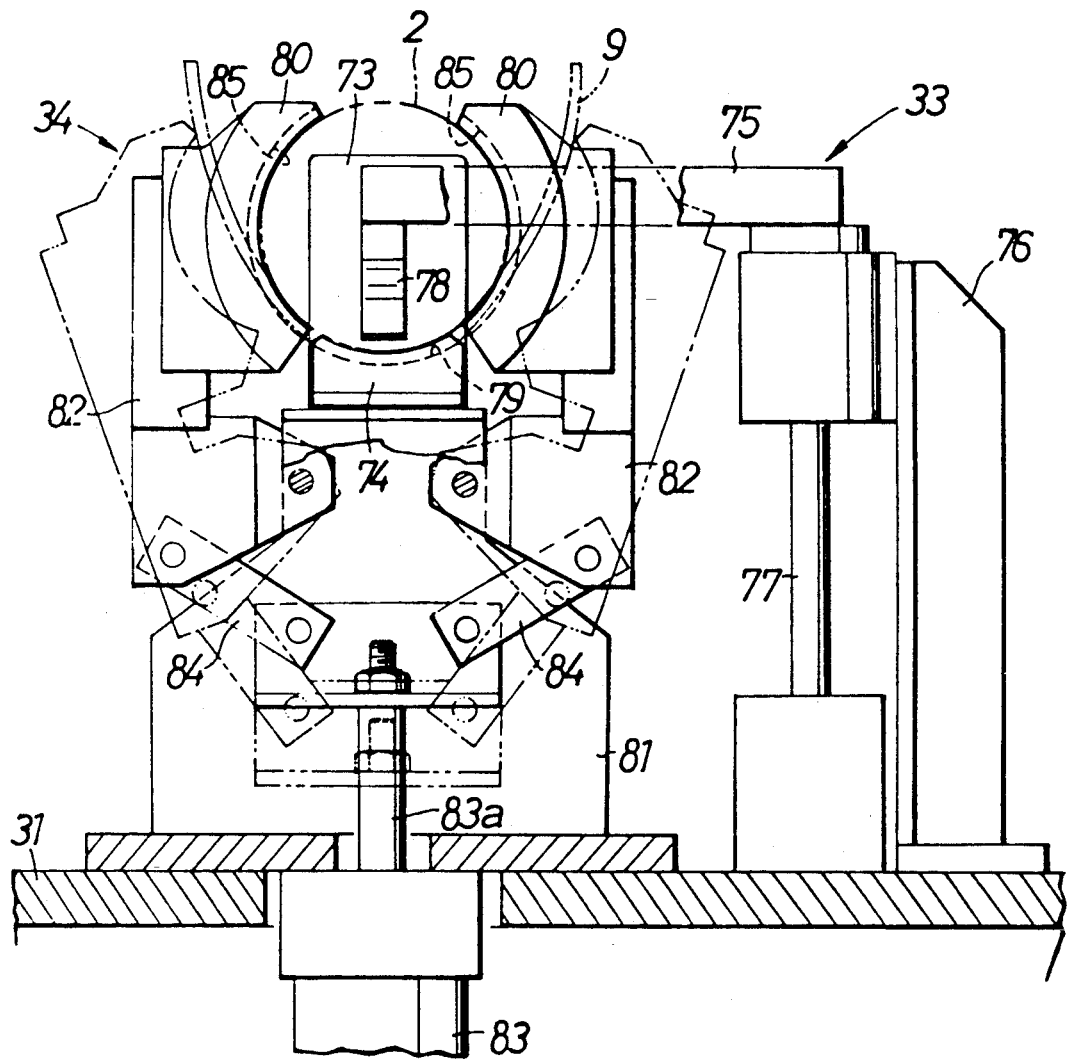
Figure 10:
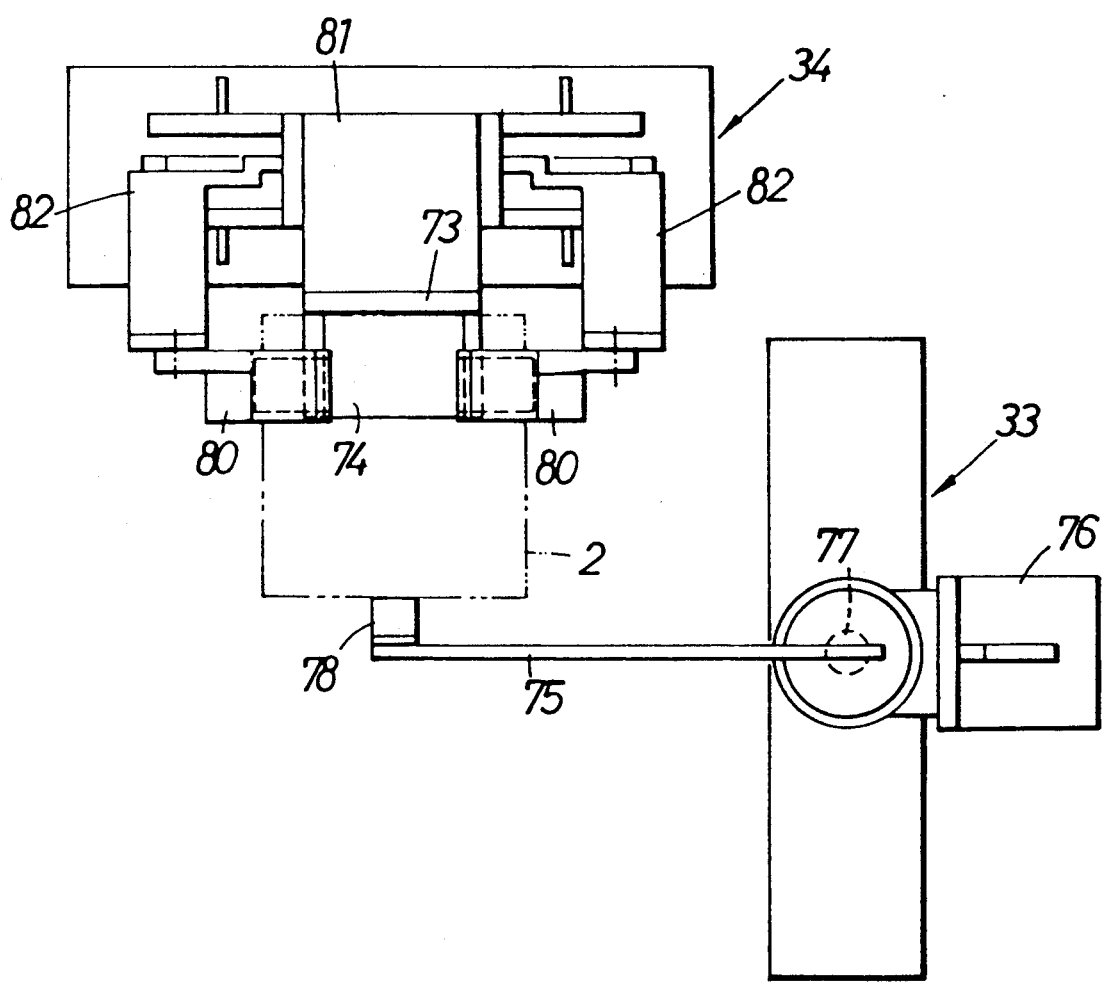

The construction and operation of each of the above devices will be described below in detail. First referring to FIGS. 4 to 10, the insert component assembling device 11 will be described. FIG. 4 is a side view of the insert component assembling device 11; FIG. 5 is a plan view thereof; FIG. 6 is an enlarged sectional view taken along a line VI—VI in FIG. 5; FIG. 7 is a plan view of the device 11 shown in FIG. 6; FIG. 8 is a view taken along an arrow VIII in FIG. 7; FIG. 9 is an enlarged sectional view taken along a line IX—IX in FIG. 5; and FIG. 10 is a plan view of the device shown in FIG. 9.

The insert component assembling device 11 comprises a pair of left and right peripheral surface protecting member attaching mechanisms 32, a pair of left and right catalyst holding mechanisms 33, a pair of left and right seal member wrapping mechanisms 34 and a pair of left and right welding machines 35, the pairs of these components being disposed laterally symmetrically on a stand or frame 31 fixedly disposed on a floor surface.

Referring to FIGS. 4 and 8, the peripheral surface protecting member attaching mechanism 32 comprises a travel frame 36 which is advancible and retreatable on the stand 31, an advancing and retreating cylinder 37 for driving the travel frame 36 for advancing and retreating movements, four guide members 38 --- disposed to constitute a cylindrical assembly and supported on the travel frame 36 for movement in a radial direction of the cylindrical assembly, a rod 39 supported on the travel frame 36 for movement in directions of advancing and retreating movements of the travel frame 36 and having a cam 39a provided at an intermediate portion thereof, cam followers 40 --- operatively connected to the guide members 38 --- in contact with the cam 39a, a guide member expanding and contracting cylinder 41 connected to the rod 39, a retaining plate 42 for urging circumferentially opposite ends of the peripheral surface protecting member 8 wrapped over the guide members 38 ---against the latter, a ring 43 disposed to surround the guide members 38 --- and supported on the travel frame 36 for movement in an axial direction of the rod 39 to push the peripheral surface protecting member 8 toward the catalyst 2, and an urging cylinder 44 for driving the ring 43 for advancing and retreating movements thereof.

A stationary frame 45 is fixedly mounted on the stand 31, and a pair of parallel rectilinear guide rails 46, 46 are secured to the stationary frame 45.

The travel frame 36 is comprised of a base 47 travellably fitted on the guide rails 46, 46, a support plate 48 stood on the base 47, a bottomed cylindrical member 49 attached, with its closed end projecting outwardly, to a portion of the support plate 48 closer to its upper end, and a guide plate 50 secured to the cylindrical bottomed member 49 so that an opened or inner end thereof is closed.

The advancing and retreating cylinder 37 is supported on the stationary frame 45 with its axis parallel to the guide rails 46, 46 and connected to the base 47. Thus, the travel frame 36 is advanced and retreated along the guide rails 46, 46 in response to the expansion and contraction of the advancing and retreating cylinder 37.

The support plate 48 is raised on the base 47 perpendicularly to the longitudinal direction of the guide rails 46, 46. The bottomed cylindrical member 49 is formed to have a square cross-section and attached, with its axis parallel to the longitudinal direction of the guide rails 46, 46, to the portion of the support plate 48 closer to its upper end. The rod 39 is supported for axial movement by the closed end of the bottomed cylindrical member 49 and the guide plate 50, and the axis of the rod 39 is also parallel to the guide rails 46, 46. Moreover, the rod 39 has the cam 39a provided at an intermediate portion of the rod 39 within the bottomed cylindrical member 49. The cam 39a is tapered so that the diameter thereof is reduced axially forwardly (leftwardly as viewed in FIG. 6).

A bracket 51 is secured to an outer surface of the support plate 48 at a location corresponding to the bottomed cylindrical member 49, and the guide member expanding and contracting cylinder 41 is supported by the bracket 51 and coaxially connected to the rod 39. Thus, the rod 39, i.e., the cam 39a can be reciprocally operated axially within the bottomed cylindrical member 49 in response to the expansion and contraction of the guide member expanding and contracting cylinder 41.

Each of the guide member 38 --- is formed into a circular shape with a center angle of 90 degree about an extension of the axis of the rod 39, and the cylindrical member is formed by allowing the circumferentially opposite ends of the guide members 38 — to abut against each other. A slide plate 52 extending outwardly in a radial direction of the rod 39 is secured to that end of each of the guide members 38 --- which is closer to the guide plate 50. On the other hand, a guide portion 53 extending radially outwardly of the rod 39 is provided in the guide plate 50 at a portion corresponding to each of the slide plates 52 ---, and each of the slide plates 52

--- is slidably fitted in corresponding one of the guide portions 53 ---. Therefore, the guide members 38 --- are supported on the travel frame 36 for movement in a radial direction of the rod 39.

Through holes 56 are made in a sidewall of the bottomed cylindrical member 49 at locations corresponding to the slide plates 52 ---, respectively, and a follower plate 54 extending radially of the rod 39 is disposed to pass loosely through each of through holes 56 ---. Moreover, each of the follower plates 54 --- is connected to corresponding one of the slide plates 52 --- through a pair of connecting plates 55, 55. A roller-like cam follower 40 is pinned at an inner end of each of the follower plate 54 ---. The cam followers 40 --- are in slide contact with the cam 39a of the rod 39. Further, a spring 57 is provided between each of the follower plates 54 --- and the bottomed cylindrical member 49 for exhibiting a resilient force in a direction to biasing the follower plate 54 inwardly, i.e., to bring the cam follower 40 into slide contact with the cam 39a.

Thus, the follower plates 54 ---, i.e., the slide plates 52 --- and the guide members 38 --- are moved radially of the rod 39 in response to the axial movement of the rod 39. More specifically, when the rod 39 is advanced, the guide members 38 --- is moved in a direction to increase the outside diameter of the cylindrical assembly constituted by cooperation of them. Conversely, when the rod 39 is retreated, the guide members 38 --- is moved in a direction to reduce the outside diameter of the cylindrical assembly.

The sheet-like peripheral surface protecting member 8 is wrapped around the peripheries of the guide members 38 at their leading end sides, and the circumferentially opposite ends of the peripheral surface protecting member 8 in the wrapped state are welded by the welding machine 35. To accomodate the welding by the welding machine 35, an elongated hole 58 longer in an inclined direction in respect to the axis of the rod 39 is made in the uppermost one of the four guide members 38 ---. A welding back bar 59 is connected at its base end to a central portion of the guide plate 50, so that when the guide members 38 --- are in their contracted states, the welding back bar 59 slightly projects from the elongated hole 58, but when the guide members 38 ---are in their expanded states, the bar 59 is sunk into the elongated hole 58.

The inside diameter of the ring 43 is set to regulate the largest diameter position of each of the guide members 38 ---, and each of a pair of guide rods 60, 60 have an axis parallel to the ring 43 and is connected at one end of the guide rod 60 to the ring 43 to movably pass through the support plate 48. The other ends of the guide rods 60, 60 are interconnected by a connecting bar 61. Moreover, the urging cylinder 44 has an axis parallel to the guide rods 60, 60 and are supported on the support plate 48 below the bracket 51, and a piston rod 44a of the urging cylinder 44 is connected to the connecting bar 61. Thus, the ring 43 is relatively moved axially relative to the guide members 38 --- in response to the expansion and contraction of the urging cylinder 44.

A support post 62 is raised on the stand 31 sideways of the stationary frame 45, and the retaining plate 42 is swingably carried on an upper portion of the support post 62. Specifically, the retaining plate 42 is supported on the support post 62 for swinging movement between a retaining position in which the overlapped circumferentially opposite ends of the peripheral surface protecting member 8 wrapped on the guide members 38 --- are urged against he guide member 38 at a portion of corresponding to the elongated hole 58, and a releasing position in which such urging condition is released. Attached to the support post 62 are a cylinder 63 for pivotally driving the retaining plate 42 toward the urging position, and a cylinder 64 for pivotally driving the retaining plate 42 toward the releasing position.

Moreover, the retaining plate 42 is provided at its leading end with an elongated hole 65 corresponding to the elongated hole 58 in the guide member 38 and longer in a longitudinal direction of the the elongated hole 58.

The welding machine 35 comprises an electrode 69 vertically movably mounted on a leading end of an arm 68 provided on a slider 67 which is movably supported on a slide guide 66. The slide guide 66 is mounted on an upper end of a support post in parallel to the longitudinal direction of the elongated holes 58 and 65. The level of the slide guide 66 is set at a location above the guide members 38 ---. A cylinder 71 is disposed on the slide guide 66 with an axis extending in a longitudinal direction of the slide guide 66 and connected to the slider 67. Thus, the slider 67 is moved along the slide guide 66 in response to the expansion and contraction of the cylinder 71.

A cylinder 72 having a vertically extending axis is disposed at a leading end of the arm 68, and the electrode 69 is connected to a piston rod 72s in the cylinder 72. Moreover, the length of the arm 68 is set such that the electrode 69 can be disposed at locations corresponding to the elongated hole 65 in the retaining plate 42 and the elongated hole 58 in the guide member 38.

Referring to FIGS. 9 and 10, the catalyst holding mechanism 33 serves to hold the catalyst 2 in a horizontal attitute coaxial with the rod 39 on an extension of the rod 39 in the peripheral surface protecting member attaching mechanism 32 and comprises an abutment plate 73 aginst which one end face of the catalyst 2 is permitted to abut, a receiver 74 for supporting a lower surface of the catalyst 2 at one end side thereof, and an urging bar 75 adapted to abut against the other end face of the catalyst 2 for urging the catalyst 2 toward the abutment plate 73.

The abutment plate 73 is fixedly disposed on a support stand 81 disposed on the stand 31 perpendicularly to the extension of the axis of the rod 39. The receiver 74 has an upper surface arcuately-shaped to support the lower surface at its one end side of the catalyst 2 which is in abutment at its one end against the abutment plate 73 and is fixedly disposed on the support stand 81. Further, a pivotal shaft 77 is supported for pivotal movement about a vertical axis on a support member 76 which is disposed on the stand 31 sideways of the catalyst 2 supported by the abutment plate 73 and the receiver 74, and a base end of the urging bar 75 is secured to an upper end of the pivotal shaft 77. Thus, the pivotal shaft 77 is rotated about the vertical axis by a driving means which is not shown, so that the urging bar 75 can be pivotally moved, by the rotation of the pivotal shaft 77, between an urging position in which a leading end of the urging bar 75 is opposed to the other end of the catalyst 2 and a position in which such leading end is retracted from the urging position. Moreover, a leaf spring 78 is secured to the leading end of the urging bar 75 and abuttable against the other end face of the catalyst 2.

The seal member wrapping mechanism 34 comprises a fitting groove 79 which is provided in an upper surface of the receiver 74 and into which a central portion of the band-like seal member 9 is fitted, and a pair of wrapping claws 80, 80 disposed on the opposite sides of the catalyst 2 to pick up the opposite ends of the seal member 9 fitted in the fitting groove 79 to wrap then around the periphery of the catalyst 2.

Each of the wrapping claws 80, 80 is secured to corresponding one of swingable arms 82, 82 which are carried on the support stand 81 for swinging movement about a horizontal axis. On the other hand, a cylinder having a vertically extending axis is fixedly disposed on the stand 31, and arms 84, 84 are connected at one ends thereof to a piston rod 83a in the cylinder 83 and at the other ends thereof to the swingable arms 82, 82, respectively. This permits the swingable arms 82, 82, i.e., the wrapping claws 80, 80 to be swung about the horizontal axes in response to the expansion and contraction of the cylinder 83. Moreover, each of inner surfaces of the wrapping claws 80, 80 is provided with a fitting groove 85 into which the seal member 9 is fitted.

The operation of the insert component assembling device 11 will be described below. With the catalyst 2 horizontally placed on the receiver 74 with one end of the catalyst 2 abutting against the abutment plate 73 in a condition in which the longitudinal central portion of the band-like seal member 9 is fitted in the fitting groove 79, the urging bar 75 is pivotally moved, thereby allowing the leaf spring 78 at the leading end of the urging bar 75 to resiliently abut against the other end of the catalyst 2. This ensures that the catalyst 2 is held in a horizontal attitude by the catalyst holding mechanism 33.

When the cylinder 83 is then expanded, the wrapping claws 80, 80 are pivotally moved to pick up portions of the seal members 9 on the opposite sides of the receiver 74 with the seal member 9 fitted into the fitting grooves 85, 85. This causes the seal member 9 to be wrapped around that portion of the catalyst 2 which is closer to the one end thereof. The opposite ends of the seal member 9 are joined to each other to complete the wrapping of the seal member 9 around the catalyst 2.

On the other hand, in the peripheral surface protecting member attaching mechanism 32, the peripheral surface protecting member 8 is wrapped around the guide members 38 ---which have been brought into the contracted states, and the opposite ends of the peripheral surface protecting member 9 are overlapped and placed on a portion corresponding to the elongated hole 58 in the uppermost guide member 38. Then, with the opposite ends of the peripheral surface protecting member 8 retained by the retaining plate 42, the opposite ends are clamped between the electrode 69 of the welding machine 35 and the welding back bar 59, and the guide members 38 --- are spreaded by a predetermined amount and then energized to provide a spot welding of two or three points in the longitudinal direction of the elongated holes 58 and 65. This results in the peripheral surface protecting member 8 formed into a cylindrical shape.

Then, the guide members 38 --- are further operated in an expanding or diameter-increasing direction to expand the peripheral protecting member 8, and the urging of the catalyst by the urging bar 75 is released. Thereafter, the travel frame 36 is moved to a position proximate to the catalsyt 2 and then, the ring 43 is urged toward the catalyst 2. This causes the peripheral surface protecting member 9 to be smoothly moved from the guide members 38 ---toward the catalyst 2 and thus mounted on the catalyst 2.

In this manner, an insert component assembly 86 is obtained (see FIG. 1) which comprises the peripheral protecting member 8 and the seal member 9 wrapped around the outer periphery of the catalyst 2. The insert component assembly 86 is transported toward the casing temporarily-welding device 12 by the first transporting device 17.

Figure 11:
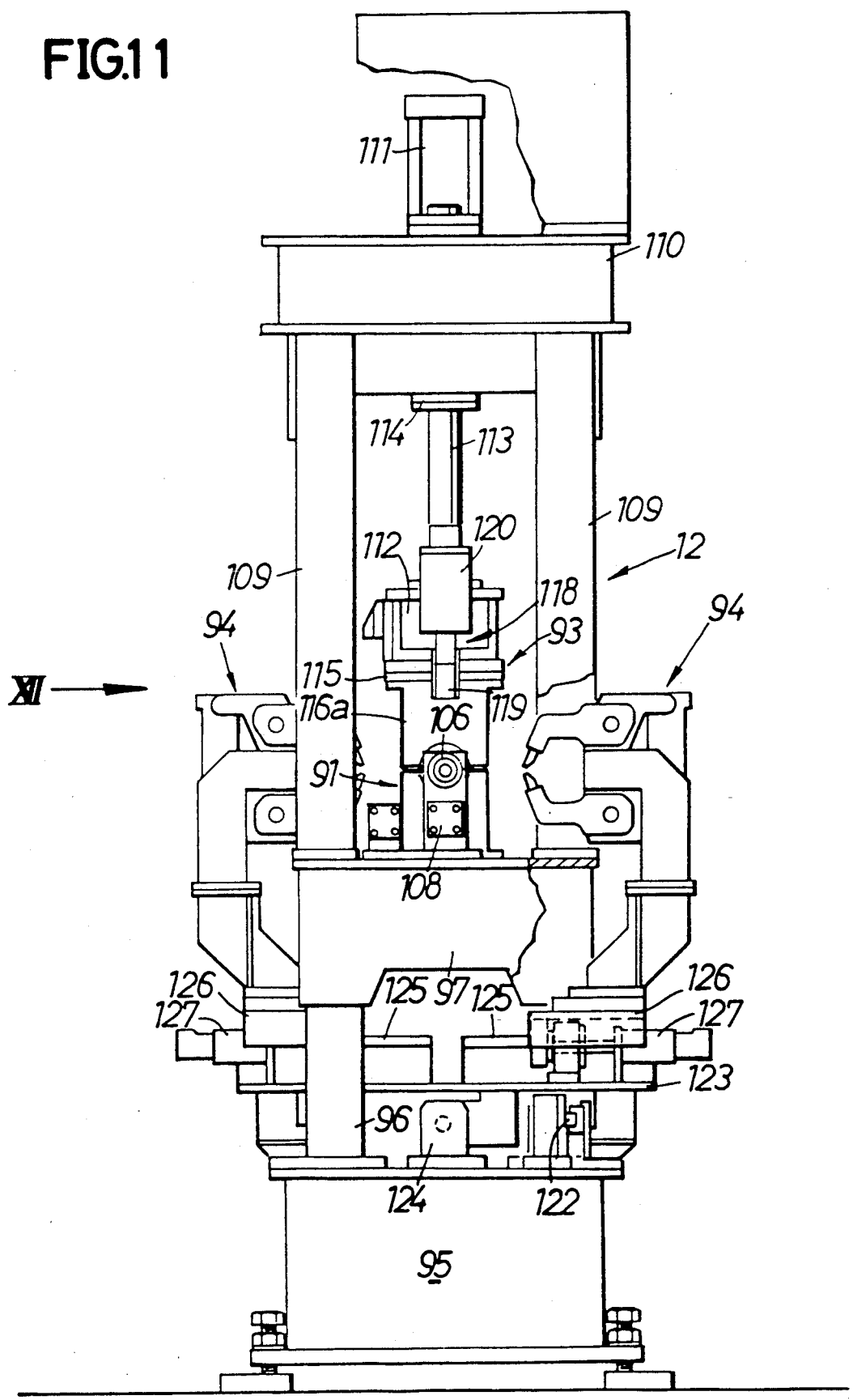

The construction and operation of the casing temporarily welding device 12 will be described with reference to FIGS. 11 to 15D. FIG. 11 is a front view of the casing temporarily-welding device 12; FIG. 12 is a side view taken in a direction of an arrow XII; FIG. 13 is an enlarged view of essential portions shown in FIG. 12; FIG. 14 is a sectional view taken along a line XIV—XIV in FIG. 13; and FIGS. 15A, 15B, 15C and 15D are views for illustrating the sequence of the assembling process.

The casing temporarily-welding device 12 comprises a stationary receiver 91, a pair of positioning members 92, 92', a lift bearer 93 liftable on the stationary receiver 91, and welding machines 94, 94 disposed on opposite sides of the stationary receiver 91. A temporary welding is carried out by the casing temporarily welding device 12.

A base 95 is fixedly disposed on a floor surface, and a plurality of, e.g., four support posts 96 are raised on the base 95. A horizontal support stand 97 is supported on an upper end of the support posts 96, and the stationary receiver 91 is detachably fixed on the support stand 97.

The stationary receiver 91 is arranged so that the one casing half 1a of the casing 1 in the catalytic converter C can be placed on the stationary receiver 91 with its inner surface directed upwardly. The stationary receiver 91 comprises a base plate 98 placed on the support stand 97, and holding claws 99a, 99b, 99c and 99d rised on the base plate 98 to support the outer surface of the casing half 1a at a plurality of, e.g., four longitudinally spaced points. An upper end face of each of the holding claws 99a, 99b, 99c and 99d is formed into a shape corresponding to the shape of the outer surface of the casing half 1a. A positioning plate 100 is also disposed on the base plate 98 adapted to abut against one end of the casing half 1a for performing a positioning thereof.

To detachably fix the stationary receiver 91 on the support stand 97, a pair of clamp mechanisms 101, 101 are disposed on the support stand 97. The clamp mechanism 101 comprises an engage claw 102 which is engageable with and disengageable from an upper surface of the base plate 98 of the stationary receiver 91, and a clamping cylinder 103 connected to the engage claw 102. The clamp mechanism 101 is disposed on the support stand 97 to bring the engage claw 102 into engagement with the rectangularly-shaped base plate 98 on a diagonal line of the latter.

A plurality of positioning pins 104 are embedded in the support stand 97 and adapted to be fitted in the base plate 98 to position the base plate 98, and a positioning plate 105 is disposed on the support stand 97 to abut against a side face of the base plate 98.

The positioning members 92 and 92' are basically formed into a bar-like shape to position the insert component assemblies 86, 86 within the casing half 1a placed on the stationary receiver 91 and are advanceable and retreatable between a position in which end faces of the catalysts 2, 2 in the insert component assemblys 86, 86 abut against each other within the casing half 1a and a position in which the end faces of the catalysts 2, 2 in the insert component assemblies 86, 86 are retracted out of the casing half 1a. More specifically, the positioning member 92 is comprised of a bar-like portion 92a axially and movably supported by a cylindrical guide 106 mounted on the support stand 97, and a bar-like positioning portion 92b eccentrically connected to a leading end of the bar-like portion 92a. The positioning portion 92b has an outside diameter such that it can be inserted into the casing half 1a. On the other hand, the positioning member 92' is formed into a bar-like shape so that it is inserted into the casing half 1a from an end opposite from the positioning member 92. The positioning member 92' is supported for movement along a horizontal axis by a cylindrical guide 107 which is disposed on the support stand 97 coaxially with the cylindrical guide 106. Thus, because the axes of the openings 6 and 7 at the opposite ends of the casing 1 are offset from each other, the positioning portion 92b of the positioning member 92 and the positioning member 92' are movable on parallel axes offset from each other.

Cylinders 108, 108, which are fixedly disposed on the support stand 97, are connected to the positioning members 92 and 92' and have axes parallel to axes of the positioning members 92 and 92'. More specifically, a piston rod 108a of one of the cylinders 108 is connected to an intermediate portion of the bar-like portion 92a of the one positioning members 92, and a piston rod 108a of the other cylinder 108 is connected to an intermediate portion of the other positioning member 92'. This ensures that the positioning member 92 is driven between a position in which the leading end of the positioning portion 92b thereof abuts against the end face of the catalyst 2 within the casing half 1a to position the catalyst 2 and a position in which the positioning portion 92b is retracted out of the casing half 1a. In addition, the positioning member 92' is driven between a position in which the leading end thereof abuts against the end face of the other catalyst 2 within the casing half 1a to position the catalyst 2 and a position in which the leading end is retracted out of the casing half 1a.

Four support posts 109 are raised on the support stand 97 to extend upwardly on extensions of the corresponding support posts 96, and a horizontal ceiling frame 110 is supported by upper ends of the support posts 109. A lifting cylinder 111 having a vertical axis is disposed on an upper surface of the ceiling frame 110 at a substantially central portion thereof and has a piston rod 111a which movably passes through the ceiling frame 110 and extends downwardly, and a lift stand 112 is connected to a leading or lower end of the piston rod 111a. Moreover, a pair of guide rods 113, 113 are secured at their base ends to the lift stand 112 on the opposite sides of the piston rod 111a and slidably received in cylindrical guides 114, 114 fixed to the ceiling frame 110, respectively. Thus, the lift stand 112 is raised and lowered above the stationary receiver 91 in response to the expansion and contraction of the lifting cylinder 111.

The lift bearer 93 is detachably fixed to a lower portion of the lift stand 112. The lift bearer 93 is arranged to hold the other casing half 1b of the casing 1 in the catalytic converter C with its inner surface directed downwardly ao as to be opposed to the inner surface of the casing half 1a lying on the stationary receiver 91 and comprises a base plate 115 abutting against a lower surface of the lift stand 112, and holding claws 116a, 116b, 116c and 116d secured to the base plate 15 to support an outer surface of the casing half 1b at a plurality of, e.g., four longitudinally spaced points. A lower end face of each of the holding claws 116a to 116d is formed into a shape corresponding to a shape of the outer surface of the casing half 1b. Moreover, a magnet 117 (see FIG. 5A) is mounted on a lower end of each of the holding claws 116a to 116d for exhibiting an attractive force enough to hold the casing half 1b.

To detachably fix the lift receiver 93 to the lift stand 112, a pair of clamp mechanisms 118, 118 are disposed on the lift stand 112. The clamp mechanism 118 comprises an engage claw 119 engageable with and disengageable from a lower surface of the base plate 115 in the lift receiver 93, and a clamping cylinder 120 connected to the engage claw 119 and disposed on the lift stand 112, so that the engage claw 119 may be brought into engagement with the base plate 115 at opposite ends in the longitudinal direction of the casing half 1b.

In order to detect the moved position of one of the guide rods 113, 113 secured to the lift stand 112 to control the expanding and contracting operation of the lift cylinder 111, a position detector means 121 such as a limit switch is mounted between the ceiling frame 110 and the one guide rod 113.

The welding machines 94, 94 are intended to provide a spot welding of the joining collars 4 and 5 joined to each other at a plurality of longitudinally spaced locations, e.g., between the holding claws 99a to 99d and are disposed on the opposite sides of the stationary receiver 91 and the lift receiver 93 for movement in a longitudinal direction of the joining collars 4 and 5 and for movement toward and away from the joining collars 4 and 5.

A pair of rails 122 are laid on the base 95 to extend longitudinally of the casing half 1a lying on the stationary receiver 91, and a carriage 123 is mounted astride the rails 122 and travellable along the rails 122. Moreover, a cylinder 124 is disposed on the base 95 between the rails 122 and connected to the carriage 123, so that the carriage 123 may be driven to travel by the expansion and contraction of the cylinder 124. Two set rails 125, 125 are laid on the carriage 123 at locations opposed to each other to extend in a direction perpendicular to a direction of laying of the rails 122, and the welding machines 94, 94 are disposed on carriages 126, 126 which are travellable along the rails 125, 125. Cylinders 127, 127 having axes parallel to a direction of lying of the rails 125, 125 are disposed on the carriage 123 and connected to the carriages 126, 126. Thus, the carriages 126, 126, i.e., the welding machins 94, 94 are moved toward and away from the joining collars 4 and 5 by the expansion and contraction of the cylinders 127, 127.

The operation of the casing temporarily-welding device will be described below with reference to FIGS. 15A to 15D.

In temporarily welding the casing 1, with the lift stand 93 raised, the one casing half 1a is placed onto the stationary receiver 93 with its inner surface directed upwardly, and the other casing half 1b is retained on the lift receiver 93 with its inner surface opposed to the inner surface of the casing half 1a.

Then, the positioning members 92, 92' are advanced to a predetermined position within the casing half 1a. At this time, the insert component assembly 86 assembled in the insert component assembling device 11, i.e., the assembly with the pripheral surface protecting member 8 and the seal member 9 wrapped around the catalyst 2 is placed into the casing half 1a. The end face of the insert component assembly 86, 86 is allowed to abut against the positioning member 92, 92', thereby ensuring that positioning of each insert component assembly 86 within the casing half 1a can be reliably and easily achieved.

After completion of the positioning and placing of the insert component assembly 86, 86 within the casing half 1a, the lift receiver 93 is lowered. This causes the casing halves 1a and 1b to clamp the catalysts 2, 2 therebetween with the peripheral surface protecting member 8 and the seal member 9 interposed therebetween.

Figure 15A:
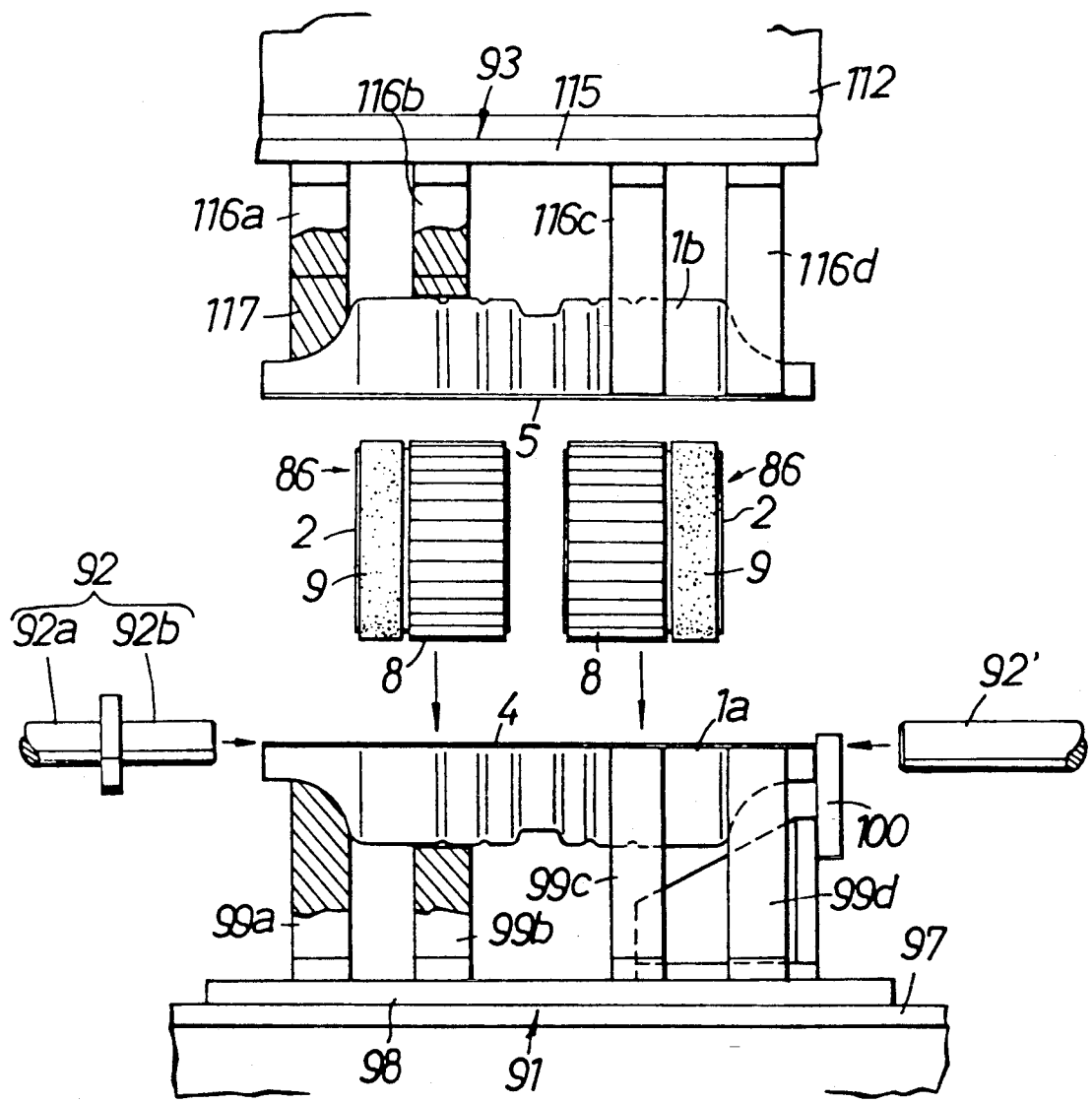
Figure 15B:
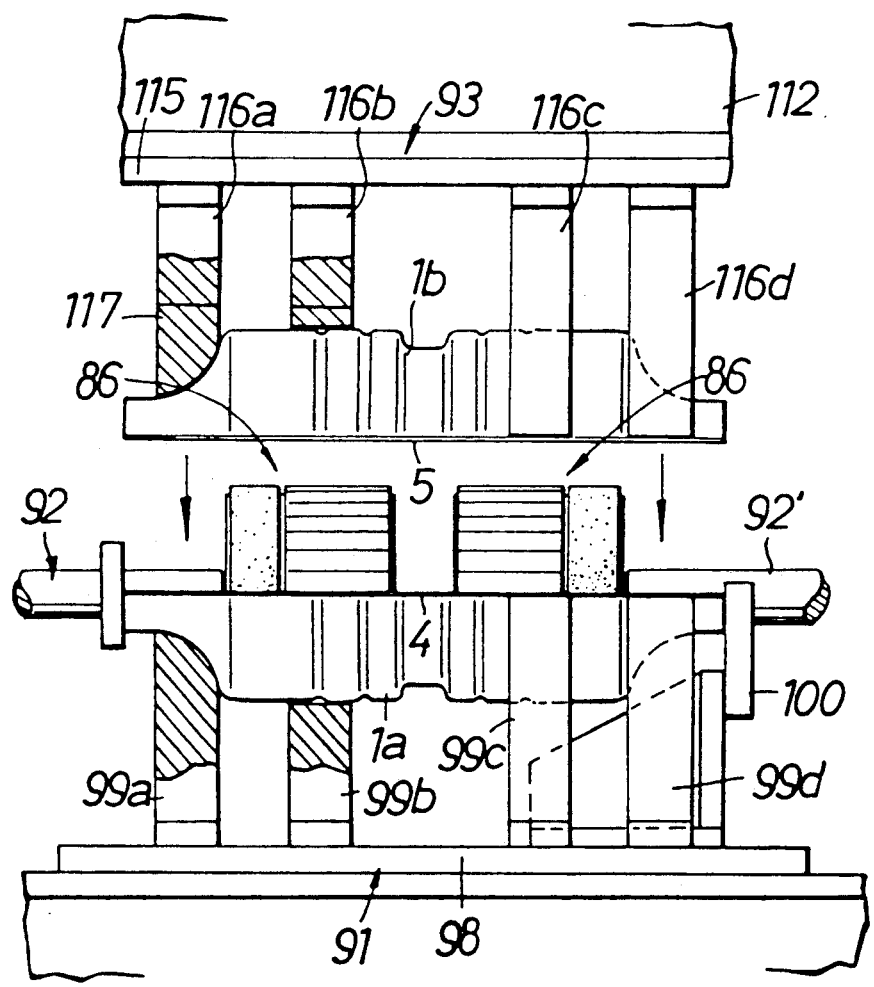
Figure 15C:
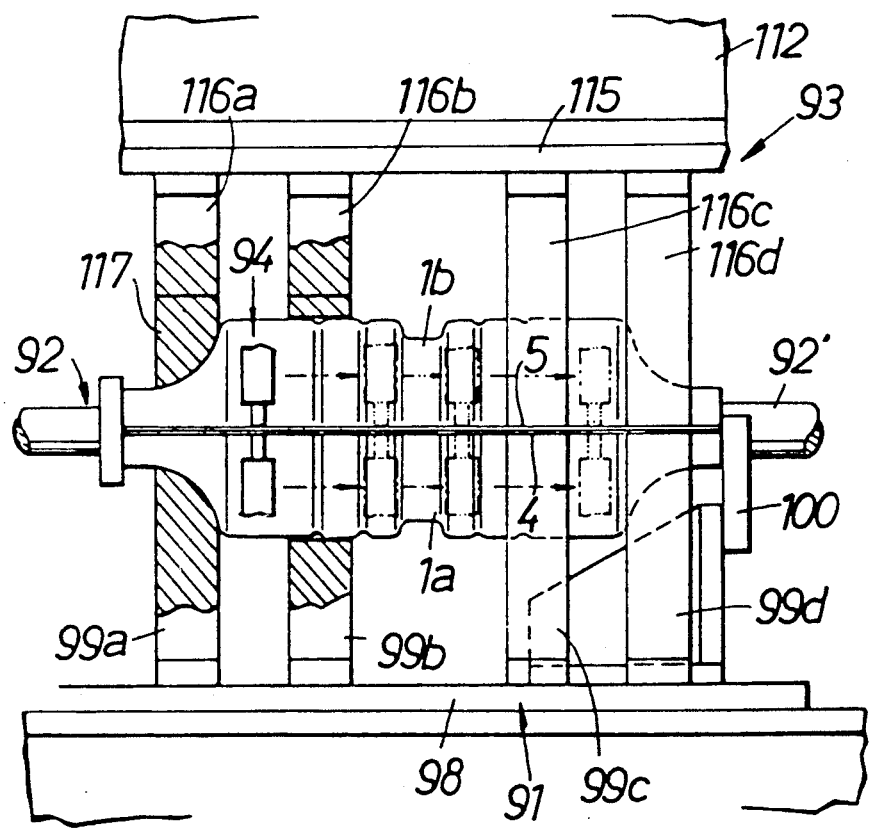
Figure 15D:
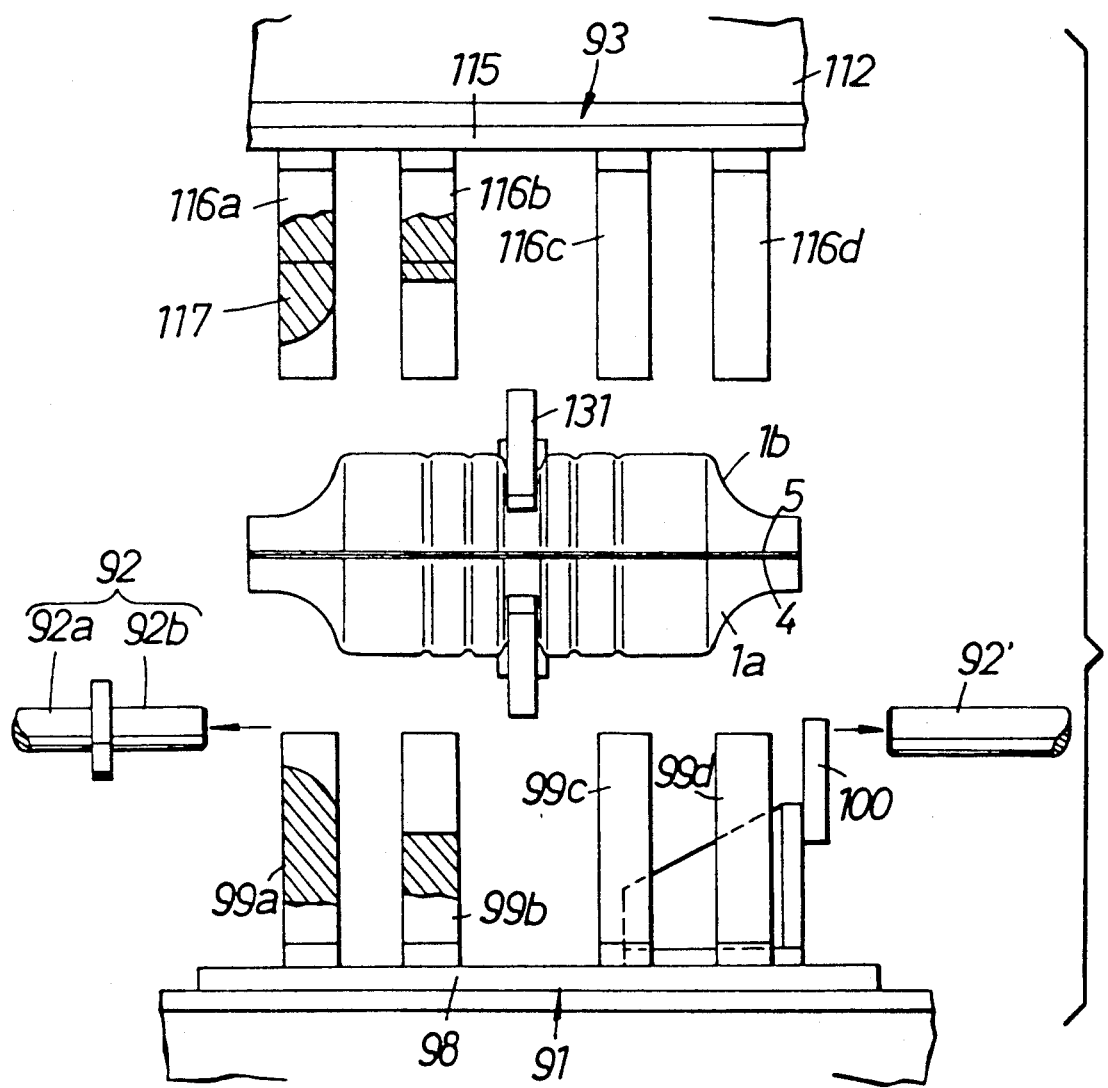

As shown in FIG. 15C, when the lift receiver 93 is lowered unitl the joining collars 4 and 5 are joined to each other, the lowering of the lift stand 112 and the lift receiver 93 is stopped, and a spot welding of the joining collars 4 and 5 is carried out by the welding machines 94, 94. More specifically, the welding machines 94, 94 performs the welding while repeating the intermittent movement in the longitudinal direction of the casing halves 1a and 1b and the movement toward and away from the casing halves 1a and 1b, whereby the joining collars 4 and 5 are spot-welded to complete the temporary assembling of the casing 1.

After completion of the temporary welding, the positioning members 92 and 92' are retracted out of the casing 1 and then, the casing 1 is grasped by the clamping means 131 for the purpose of movement thereof. The lift receiver 93 is raised and thereafter, the casing 1 which has been temporarily welded is removed.

In this manner, the temporary assembling of the casing 1 is completed in sequence through a step of placing the pair of casing halves 1a and 1b one above the other with their inner surfaces opposed to each other, a step of positioning and placing the insert component assemblies 86, 86 comprising the peripheral surface protecting member 8 and the seal member 9 wrapped around the catalyst 2 onto the lower casing halves 1a, a step of lowering the upper casing halves 1b to join the upper and lower casing halves 1a and 1b, and a step of welding the upper and lower casing halves 1a and 1b to each other.

Such assembling makes it possible to easily and reliably effect the positioning of the insert component assemblies 86, 86 within the casing 1 and to provide a facilitation and reliable achievement of the assembling.

Moreover, since the stationary receiver 91 is detachably fixed to the support stand 97 and the lift bearer 93 is detachably fixed to the lift stand 112, it is possible with a different type of a catalytic converter C to deal with the temporary assembling of a casing 1 in such different catalytic converter C by preparing a stationary receiver 91 and a lift bearer 93 associated with the casing 1 of such different catalytic convereter C.

The casing 1 temporarily assembled through the spot-welding of the joining collars 4 and 5 at the plurality of points in this manner is transported to the casing welding device 13 by the second transporting device 18.

Figure 16:
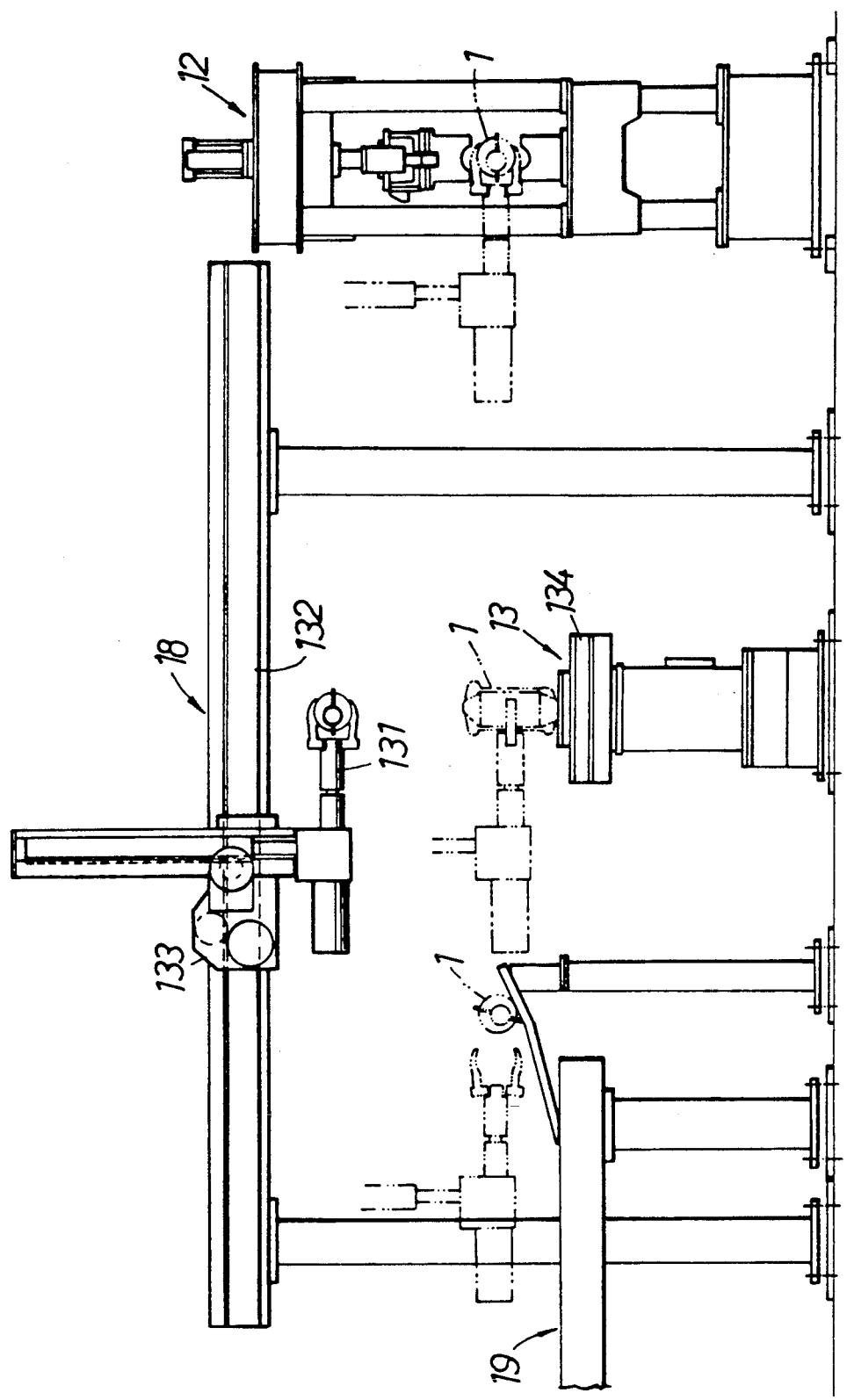
FIG. 16 is a side view of the casing temporarily welding device, a casing welding device and a third transporting device.

Referring to FIG. 16, the second transporting device 18 comprises the clamp means 131 liftably disposed for pivotal movement about the horizontal axis on a travel carriage 133 travellable along a rail 132 which is laid to extend between a position above the casing temporarily welding device 12 and a position above the third transporting device 19. The casing welding device 13 is disposed below an intermediate portion of the travel rail 132.

With this second transporting device 18, the casing 1 temporarily assembled in the horizontal attitude in the casing temporarily-welding device 12 can be grasped by the clamp means 131 and placed in a vertical attitude onto the casing welding device 13.

The casing welding device 13 is intended to seam-weld, over the entire length, the joining collars 4 and 5 of the casing which has been temporarily assembled through the spot-welding of the joining collars 4 and 5. The casing welding device 13 comprises a carrier stand 134 onto which the casing 1 is placed in its vertical attitude, a clamp mechanism (not shown) for fixing the casing 1 onto the carrier stand 134, and a welding machine (not shown) for seal-welding the joining collars 4 and 5.

The casing 1 which is over assembling as a result of completion of the seam-welding by the casing welding device 13 is grasped in the vertical attitude by the clamp means 131 and then turned into a horizontal attitude and brought to the third transporting device 19.

The third transporting device 19 is a belt conveyer, and the casing 1 which is over assembling is transported to the next flange welding device 14 by the third transporting device 19.

Figure 17:
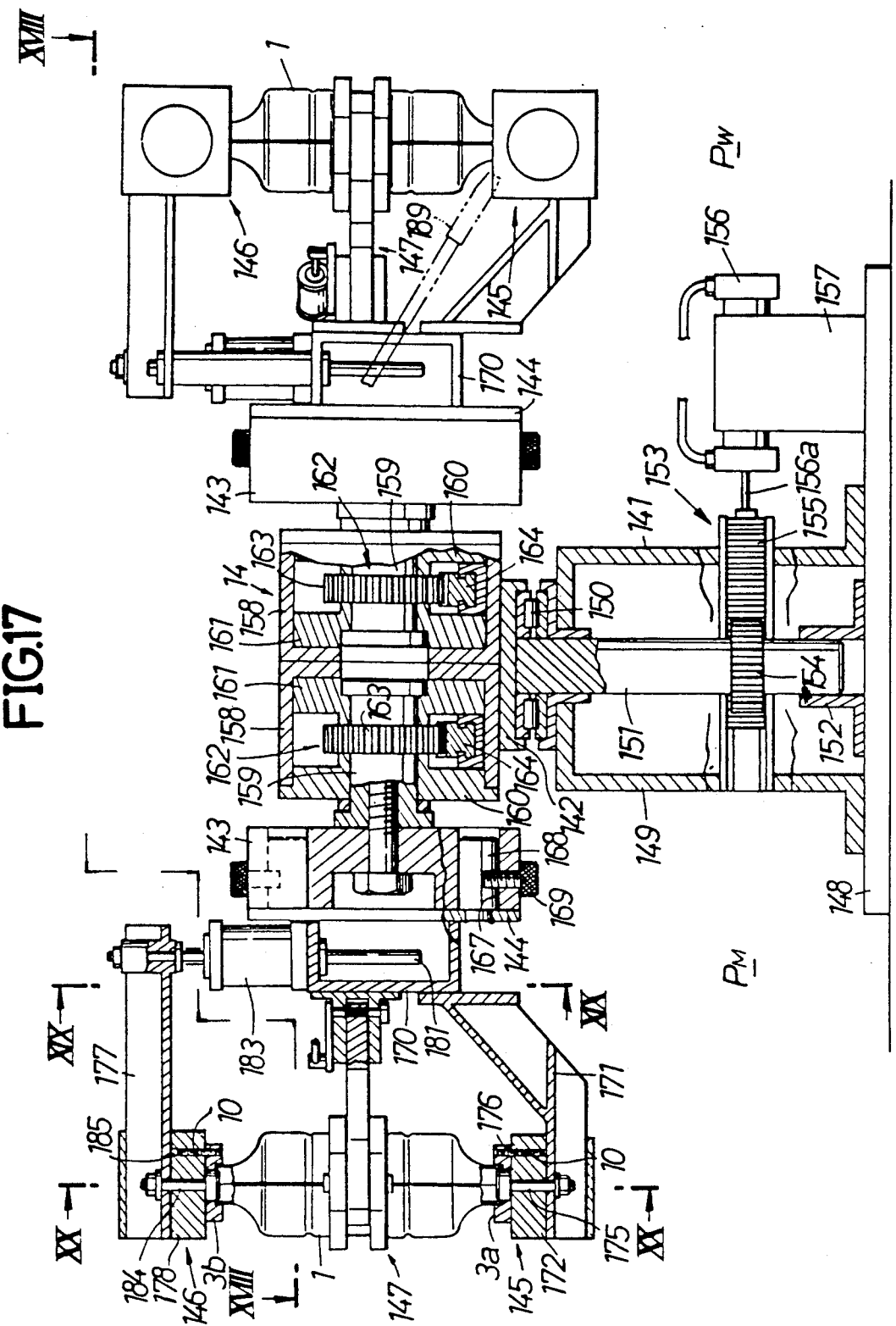
Figure 18:
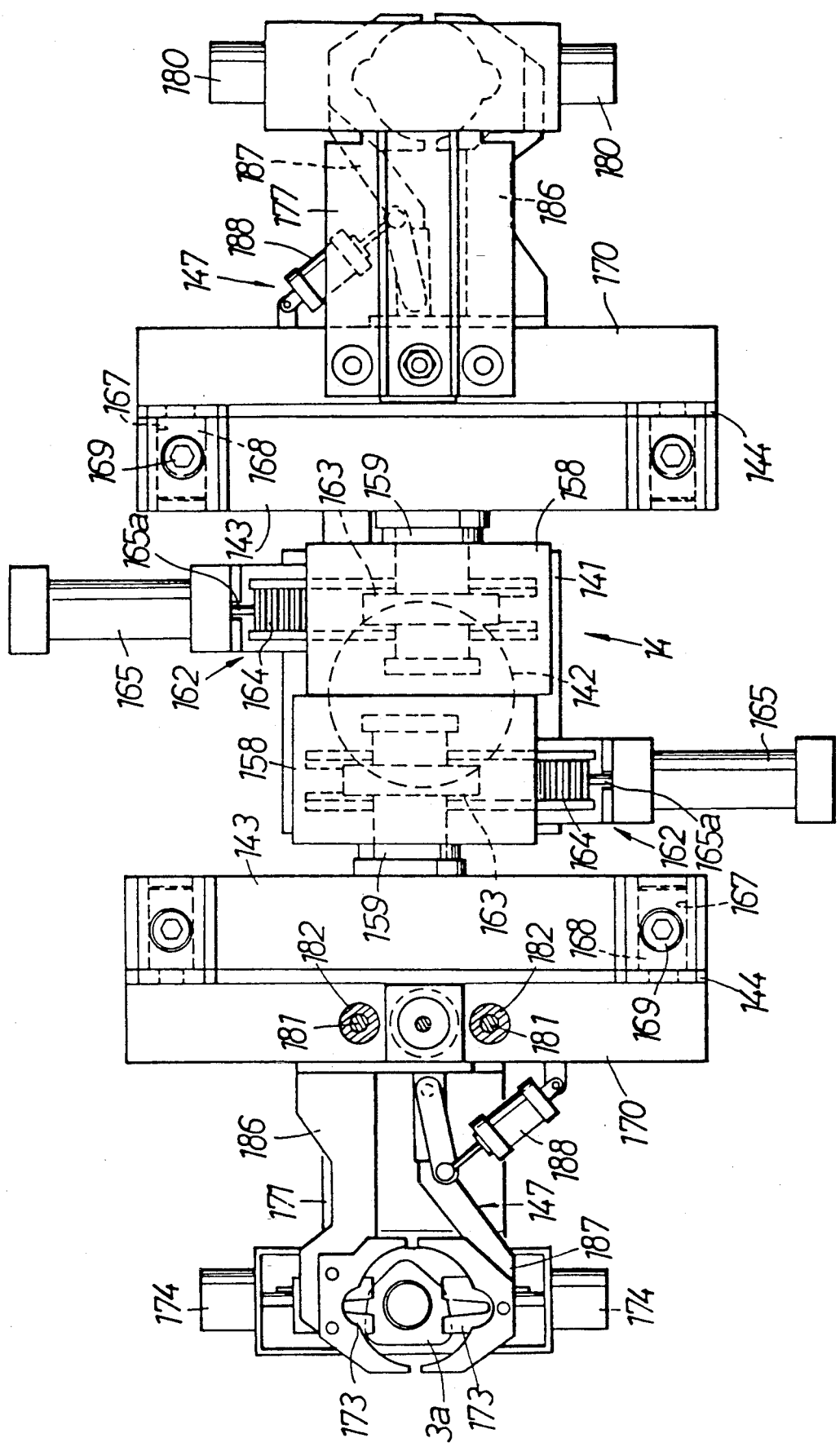
Figure 19:
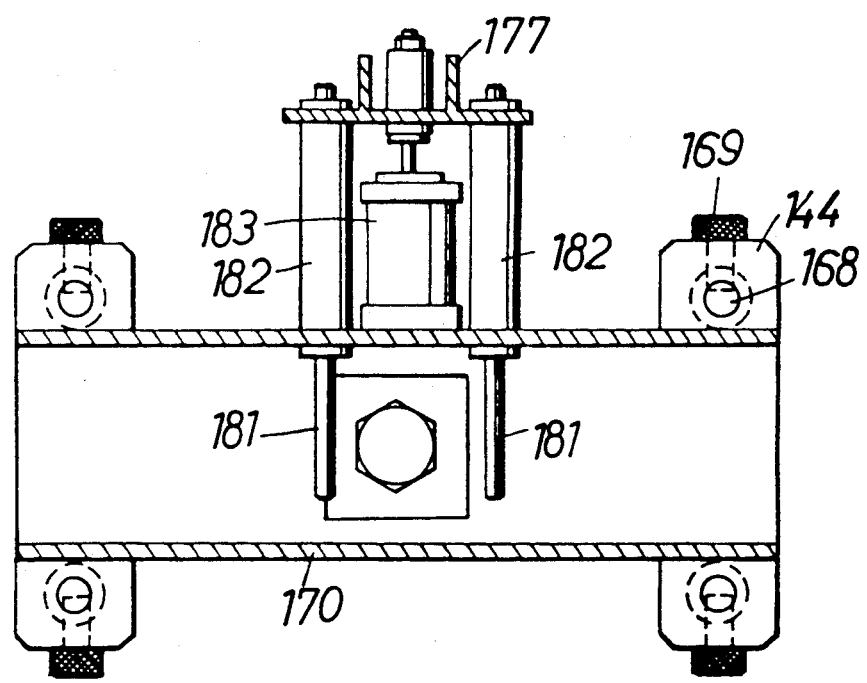
Figure 20:
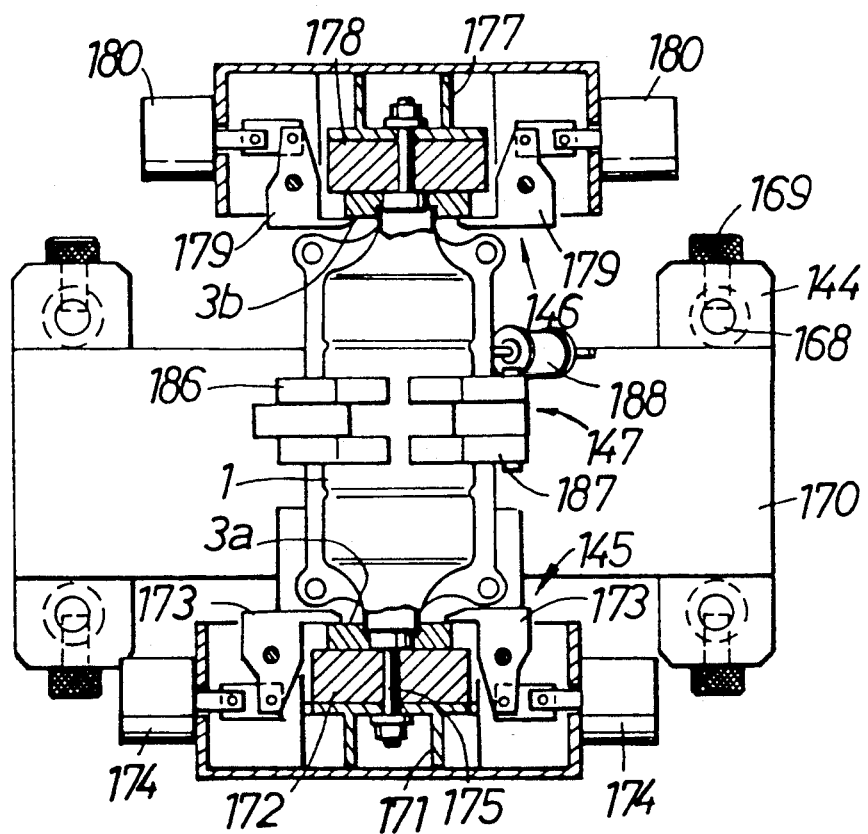

FIGS. 17 to 20 illustrate the flange welding device 14, FIG. 17 being a front view in longitudinal section of the flange welding device; FIG. 18 being a sectional view taken along a line XVIII—XVIII in FIG. 17; FIG. 19 being a sectional view taken along a line XIV—XIV in FIG. 17; and FIG. 20 being a sectional view taken along a line XX—XX in FIG. 17.

The flange welding device 14 comprises a support stand 141 disposed in a fixed position, a base 142 carried on the support stand 141 for angular displacement about a vertical axis, a turn tables 143, 143 carried on the base 142 for angular displacement about a horizontal axis, support plates 144, 144 each fixed to corresponding one of the turn tables 143, 143, first holding means 145, 145 each fixedly disposed on corresponding one of the support plates 144, 144, second holding means 146, 146 each carried on corresponding one of the support plates 144, 144 at locations opposed to the first holding means 145, 145, and clamp means 147, 147 mounted on the support plates 144, 144, respectively. The flanges 3a and 3b are welded to the opposite ends of the casing 1 in the catalytic converter C by the flange welding device 14.

The support stand 141 is comprised of a base plate 148 fixed on the floor surface, and a bottomed cylindrical support 149 vertically rised on the base plate 148 with its closed end being in an upper location. A mounting position $P_M$ and a welding position $P_W$ are established around the periphery of the support stand 141. The mounting position $P_M$ and the welding position $P_W$ are established at locations symmetrical with respect to the cylindrical support 149.

The base 142 is carried on the cylindrical support 149 of the suport stand 141 for rotation about the vertical axis. More specifically, the base 142 is disk-shaped and rotatably carried on the closed end of the cylindrical support 149 with a thrust bearing 150 inpterposed therebetween. Moreover, a downwardly extending rotary shaft 151 having a vertical axis is secured at its base end to a central portion of a lower surface of the base 142 and rotatably passes through a central portion of the closed end of the cylindrical support 149. Further, a leading or lower end of the rotary shaft 151 is slidably received in a cylindrical bearing portion 152 mounted on the base plate 148.

A base driving means 153 is connected to the rotary shaft 151 to rotate the base 142 about the vertical axis and comprised of a pinion 154 secured to an intermediate portion of the rotary shaft 151, a rack 155 meshed with the pinion 154, and a cylinder 156 connected to the rack 155. The rack 155 is carried on the cylindrical support 149 for movement in a horizontal direction perpendicular to the axis of the rotary shaft 151, and a piston rod 156a of the cylinder 156 is connected to one end of the rack projecting from the cylindrical support 149. The cylinder 156 has a horizontal axis and is supported on a support 157 mounted on the base plate 148.

Therefore, the rotary shaft 156 and thus the base 142 can be rotated about the vertical axis by the expansion and contraction of the cylinder 156.

A pair of support blocks 158, 158 formed into a rectangular box shape are fixedly mounted on the base 142 adjacent each other, and the turn tables 143, 143 are carried on the corresponding support blocks 158, 158 for rotation about the horizontal axis. More specifically, rotary shafts 159, 159 each having an axis on one horizontal stright line perpendicular to the axis of rotation of the base 142 are rotatably carried in the support blocks 158, 158 with bearing members 160, 160 interposed therebetween, and the turn tables 143, 143 are secured to projecting ends of the rotary shaft 159, 159 from the support blocks 158, 158, respectively. When one of the turn tables 143 is in the mounting position $P_M$, the other turn table 143 is in a position corresponding the welding position $P_W$.

Turn table driving means 162, 162 are connected to the rotary shafts 159, 159 to rotatably drive the corresponding turn tables 143, 143 about the horizontal axis and each comprise a pinion 163 secured to an intermediate portion of the rotary shaft 159 within the support block 158, a rack 164 meshed with the pinion 163, and a cylinder 165 connected to the rack 164. The rack 164 is carried on the support block 158 for movement in a horizontal direction perpendicular to the axis of the rotary shaft 159, and a piston rod 165a of the cylinder 165 is connected to that one end of the rack 164 which projects from the support block 158. The cylinder 165 is supported on a support arm 166 connected to the support block 158.

Accordingly, the rotary shaft 159 and thus the turn table 143 can be rotated about the horizontal axis by the expansion and contraction of the cylinder 165.

Each of the turn tables 143, 143 is formed into a rectangular block shape and provided with four insert hole 167 --- each having an axis parallel to the rotary shaft 159. The support plates 144, 144 are detachably fixed to the corresponding turn tables 143, 143. More specifically, four mounting pins 168 --- are projectingly mounted on each of the support plates 144 in correspondence to the insert holes 167 --- and inserted into the corresponding insert holes 167 ---. On the other hand, threaded members 169 --- threadedly inserted in each of the turn tables 143, 143 for advancing and retreating movements in directions perpendicular to the insert holes 167 ---, so that the support plates 144, 144 are fixed to the turn tables 143, 143 by threadedly screwing the threaded members 169 --- into the mounting pins 168 ---inserted through the insert holes 167 ---. However, it is possible to remove the support plates 144, 144 from the turn tables 143, 143 by unscrewing the threaded members 169 --- and hence, the support plates 144, 144 are detachably fixed to the turn tables 143, 143, respectively.

The first holding means 145, 145 are fixedly disposed on the corresponding support plates 144, 144 and capable of posiitoning and holding the flange 3a which is to be welded to one end of the casing 1 in the catalytic converter C. The first holding means 145 comprises a receiving plate 172 fixed to an upper portion of a leading end of an arm 171 which is provided to extend outwardly from a lower portion of a bgracket 170 secured to the support plate 144, a pair of clamp claws 173, 173 engageable with the flange 3a on the receiving plate 172, and cylinders 174, 174 for driving the clamp claws 173, 173 for engagement and disengagement of the latter.

The recieving plate 172 is provided with a positioning pin 175 projecting from an upper surface of the receiving plate 172, and with three positioning holes 176 --- into which three bolts 10 embedded in the flange 3a can be inserted, so that the flange 3a can be positioned on the receiving plate 172 by placement thereon in such a menner that the bolts 10 --- are inserted into the associated positioning holes 176 --- with the flange 3a fitted over the positioning pin 175.

The clamp claws 173, 173 are carried on the arm 171 for engagement with and disengagement from the flange 3a on the receiving plate 172, and the cylinders 174, 174 are supported on the arm 171 and each have a horizontal axis.

The second holding means 146, 146 are carried on the associated support plates 144, 144, for movement toward and away from the first holding means 145, 145, i.e., for lifting and lowering movement, in positions opposed to the first holding means 145, 145 to position and hold the flange 3b which is to be welded to the other end of the casing 1. The second holding means 146 comprises a receiving plate 178 fixed to a lower portion of a leading end of a horizontal arm 177 liftably carried on the bracket 170, a pair of clamp claws 179, 179 engageable with and disengageable from the flange 3b in a state in which it abuts against a lower surface of the receiving plate 178, and cylinders 180, 180 for driving the clamp claws 179, 179 for engagement and disengagement thereof. A magnet (not shown) is mounted on the receiving plate 178.

A pair of vertically extending guide rods 181, 181 are fixed at their upper ends to a base end of the arm 177 and slidably received in cylindrical guides 182, 182 fixed to the bracket 170, respectively. This results in the arm 177 liftably carried on the bracket 170 and thus the support plate 144. Moreover, a cylinder 183 having a vertically extending axis is fixedly supported on an upper portion of the bracket 170 between the guide rods 181, 181 and connected to the arm 177. Accordingly, the arm 177 can be lifted and lowered in response to the expansion and contraction of the cylinder 183.

The receiving plate 178 is provided with three positioning pins 184 projecting from the lower surface of the receiving plate 178 and with three positioning holes 185 ---into which three bolts 10 --- embedded in the flange 3b can be inserted, so that the flange 3b can be positioned on the receiving plate 178 by placement thereon into engagement therewith in such a menner that the bolts 10 --- are inserted into the associated positioning holes 185 --- with the flange 3b fitted over the positioning pin 184.

The clamp claws 179, 179 are carried on the arm 177 for engagement with and disengagement from the flange 3b which is in a state in which it abuts against the lower surface of the receiving plate 178, and the cylinders 180, 180 each have a horizontal axis and are supported on the arm 177.

The clamp means 147, 147 are mounted on the bracket 170 for detachably holding the casing 1 in a vertical attitude with one end fitted in the flange 3a held by the first holding means 145. The clamp means 147 comprises a stationary clamp claw 186 fixed to the bracket 170 to abut against one side of an outer periphery of a longitudinally intermediate portion of the casing 1 which is in a state with one end fitted in the flange 3a positioned and held by the first holding means 145, a swingable clamp claw 187 swingably carried on the bracket 170 for swinging movement to abut against the outer periphery of the intermediate portion of the casing 1 from the side opposite from the stationary claw 186, and a cylinder 188 supported on the bracket 170 and connected to the swingable clamp claw 187.

With such clamp means 147, it is possible to swing the swingable clamp claw 187 in response to the expansion and contraction of the cylinder 188, thereby permitting a switchover between holding of the casing 1 in a predetermined position and releasing of the casing 1.

It should be noted that the first and second holding means 145 and 146 as well as the clamp means 147 are established to hold the flanges 3a and 3b and the casing 1, wherein a direction (i.e., a lateral direction as viewed in FIG. 2) of offsetting of the axes of the openings 6 and 7 at the opposite ends of the casing in the catalytic converter C is a direction perpendicular to the axis of rotation of the turn table 143.

A welding machine 189 is disposed at a place corresponding to a location to weld the flange 3a and the casing 1 which have been brought into a lower location as a result of rotation of the turn table 143, or a location to weld the flange 3b and the casing 1 which have been brought into a lower location as a result of rotation of the turn table 143 in the welding position $P_M$.

The operation of the flange welding device 14 will be described below. In welding the flanges 3a and 3b to the opposite ends of the casing 1, the base 142 is first rotated so that one of the turn tables 143 assumes a location corresponding to the mounting position $P_M$ and the other turn table 143 assumes the welding position $P_W$. Moreover, the turn table 143 is rotated, so that the first holding means 145 assumes the lower location in the mounting position $P_M$, while at the same time, the second holding means 146 is raised and further, the clamp means 147 is opened.

In such condition, the flange 3a is placed onto the receiving plate 172 and is thus positioned and held by the first holding means 145, while the flange 3b is allowed to abut against the receiving plate 178 while being attracted thereto by the magnet, and is thus positioned and held by the second holding means 146. Further, the casing 1 is held by the clamp means 147 in a condition of the casing 1 placed with one end fitted in the flange 3a which has been held by the holding means 145. Thereafter, the flange 3b which has been held by the second holding means 146 is fitted over the other end of the casing 1 by lowering the second holding means 146.

A condition of the flanges 3a and 3b fitted over the corresponding opposite ends of the casing 1 can be obtained in this manner and in this condition, the flanges 3a and 3b are positioned at given positions relative to the casing 1.

If the base 142 is then rotated through 180 degree, the casing 1 and the flanges 3a and 3b which have been in the mounting position $P_M$ are moved to the welding position $P_W$. Then, the flange 3a and the casing 1 can be welded to each other by the welding machine 189.

Thereafter, if the turn table 143 is rotated through 180 degree, the flange 3b is brought into the lower location. Moreover, because the direction of offsetting of the axes of the openings 6 and 7 at the opposite ends of the casing 1 is the direction perpendicular to the axis about which the turn table 143 is rotated, the weld points of the flange 3b and casing 1 are brought into substantially the same location as the weld points of the flange 3b and casing 1 as a result of such rotation of the turn table 143 and hence, it is possible to extremely easily conduct the welding of the flange 3b and the casing 1 to each other by the welding machine 189.

When the welding of the casing with the both flanges 3a and 3b has been completed in this manner, the base 142 is rotated through 180 degree back to the original mounting position $P_M$ while rotating the turn table 143 again through 180 degree. In the mounting position $P_M$, the second holding means 146 is raised while opening the clamp claws 179, 179. The holding of the flange 3a by the second holding means 145 is released, and the clamping of the casing 1 by the clamp means 147 is released, thereby permitting catalytic converter C which is over the welding to be removed in the original attitude.

Moreover, since the pair of turn tables 143, 143 are disposed on the base 142, so that when one of the turn tables 143 is in the mounting position $P_M$, the other turn table is in the location corresponding to the welding position $P_W$, it is possible to conduct the mounting and removal as well as welding of the casing 1 and the flanges 3a and 3b in parallel to one another, leading to an improved efficiency of operation.

With a different type of a catalytic converter C, an alternative support plate 144 comprising a first holding means 145, a second holding means 146 and a clamp means 147 may be mounted to the turn table 143 and hence, it is possible to easily accomodate the change in type of the catalytic converter C.

The catalytic converter C which has been completed through the welding of the flanges 3a and 3b to the opposite ends of the casing 1 by the flange welding device 14 is transported to the air-tightness inspecting device 15 by the fourth transporting device 20.

Figure 21:
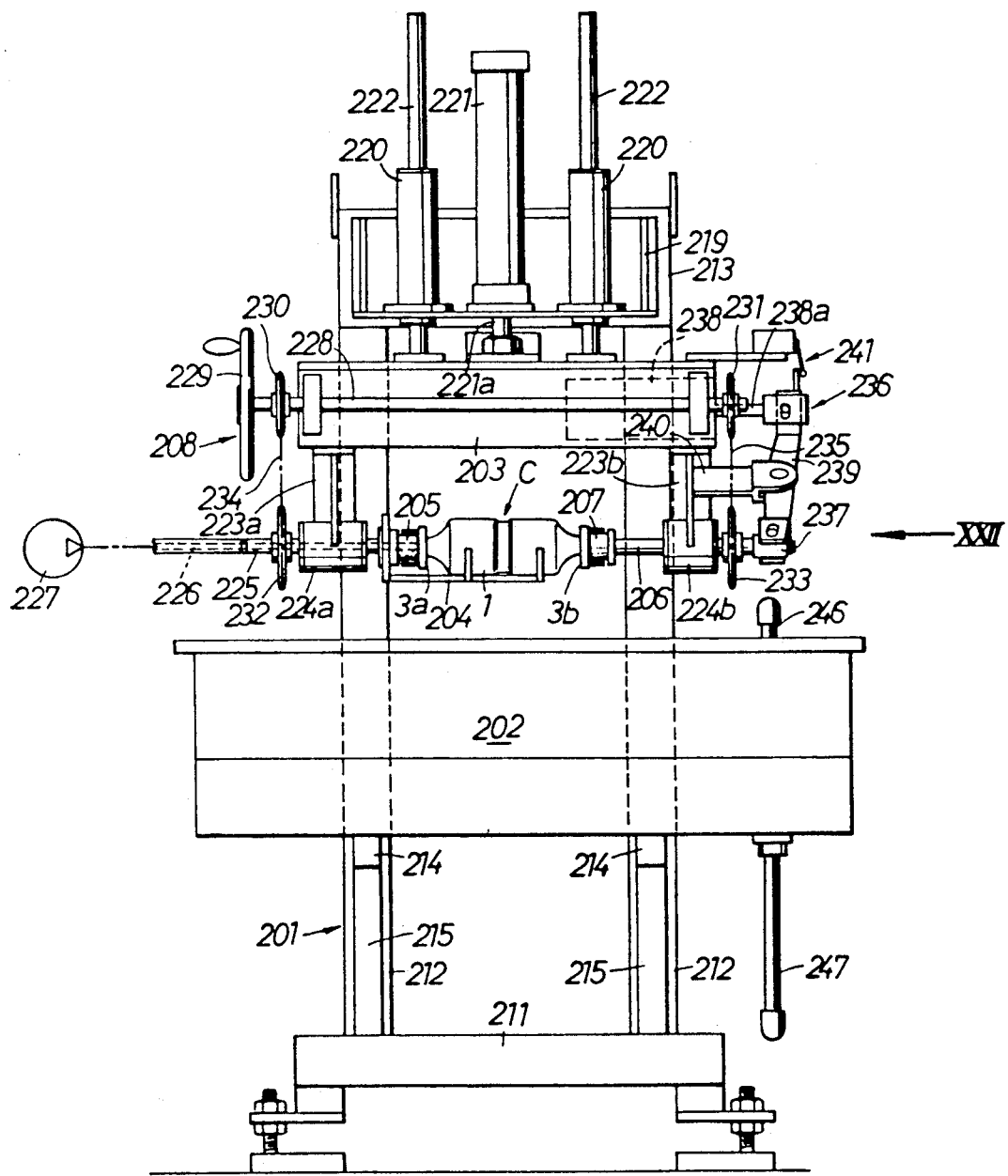
Figure 22:
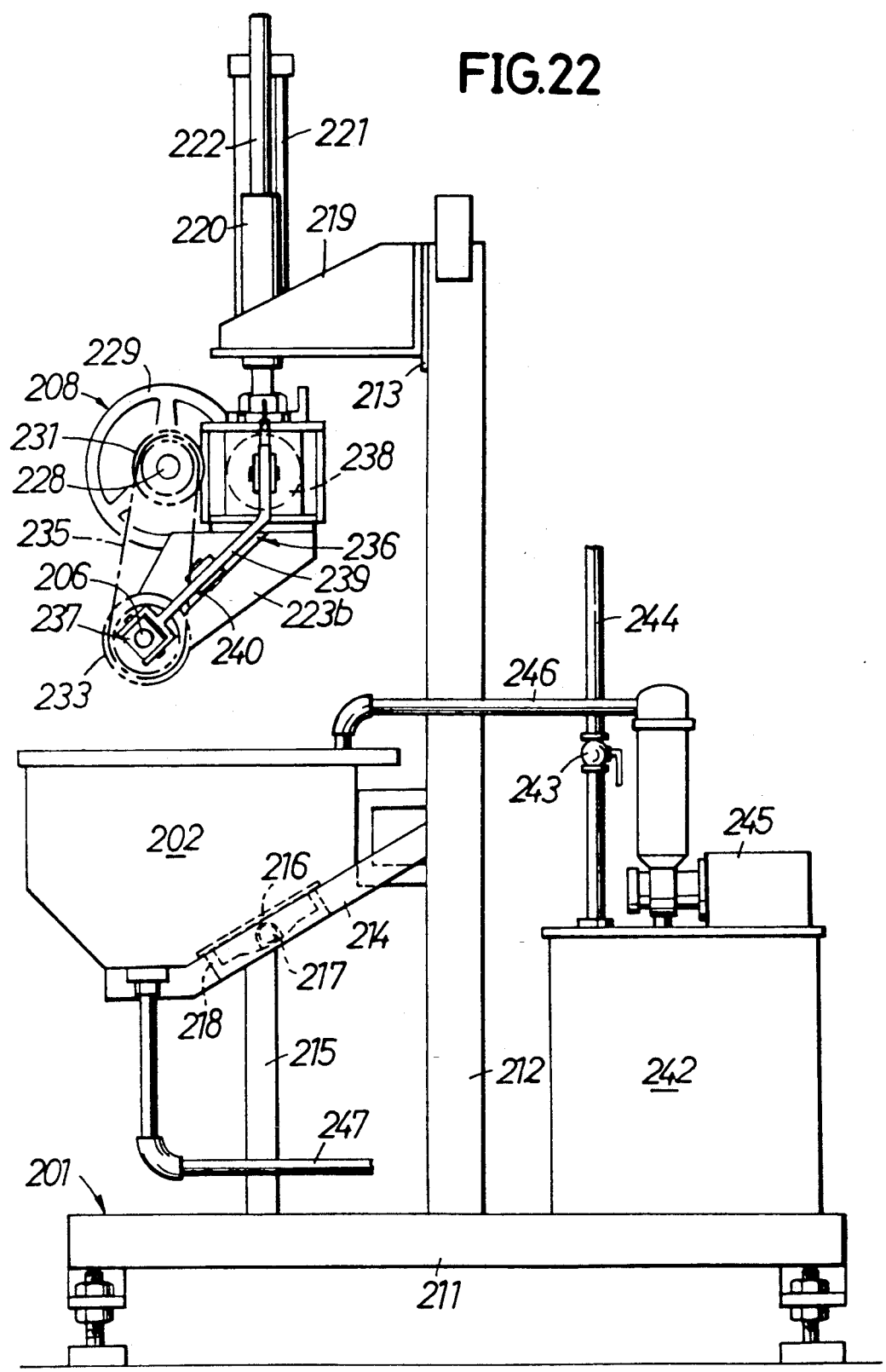
Figure 23:
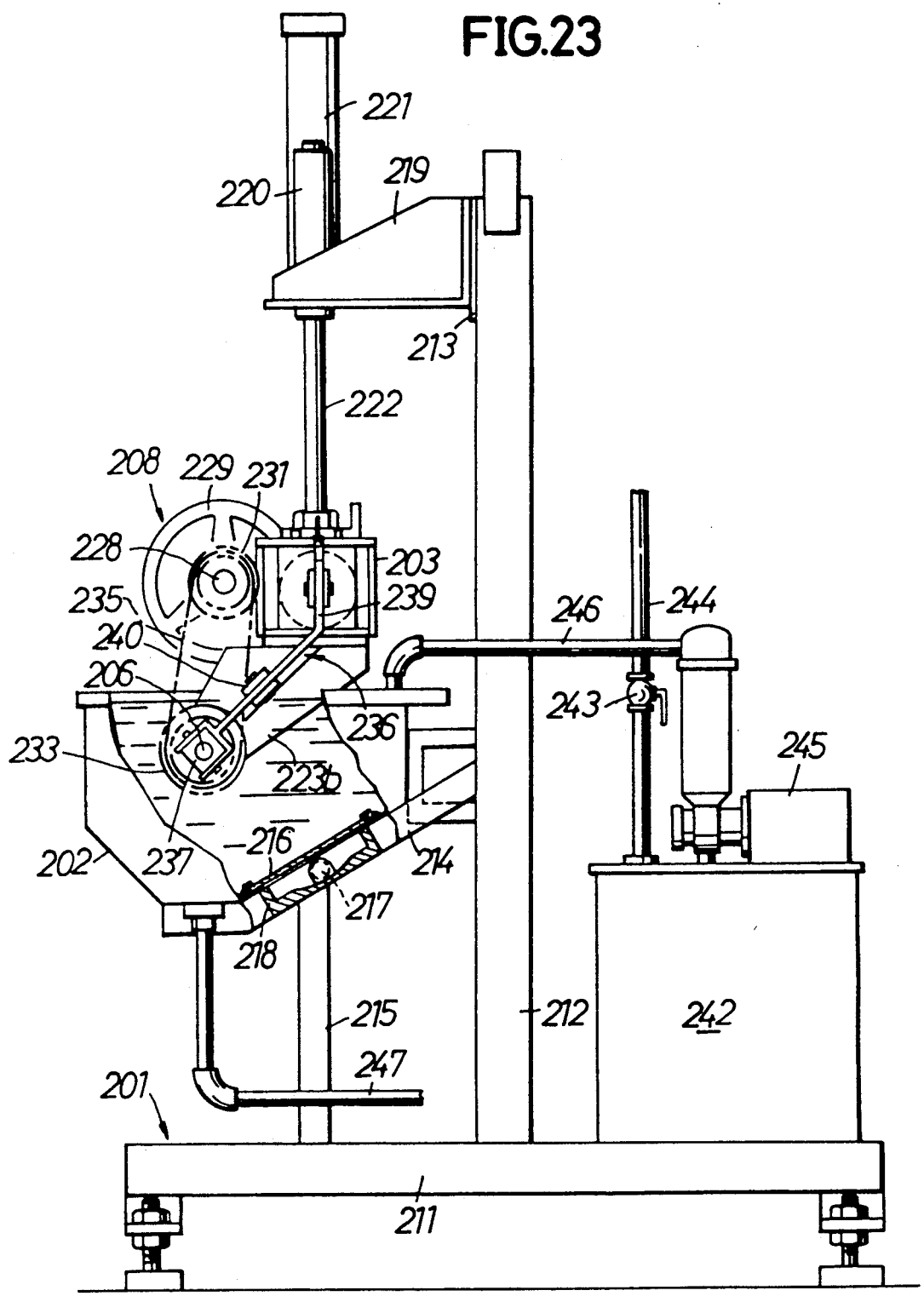

FIGS. 21 to 23 illustrate the air-tightness inspecting device 15, FIG. 21 being a front view of the air-tightness inspecting device 15; FIG. 22 being a view taken along an arrow XXII; and FIG. 23 being a partially cutaway side view taken from the same direction as the FIG. 22 but with the catalytic converter submerged into water.

The air-tightness inspecting device 15 comprises a stationary support frame 201, a water tank 202 disposed in a fixed position, a lift stand 203 liftably carried on the support frame 201, a receiving jig 204 carried on the lift stand 203, a first seal pad 205 fixed to the receiving jig 204, an urging rod 206 carried on the lift stand 203, a second seal pad 207 mounted at a leading end of the urging rod 206, and a manually operating mechanism 208 provided between the lift stand 203 and the receiving jig 204 to rotatably drive the receiving jig 204 about a horizontal axis. The air-tightness of the completed catalytic converter C is inspected by the air-tightness inspecting device 15.

The support frame 201 is comprised of a base plate 211 fixedly disposed on the floor surface, a pair of support posts 212, 212 rised on the base plate 211 at locations spaced apart from each other, and a connecting plate 213 interconnecting upper ends of the support posts 212, 212. A support arm 214 is secured to an intermediate portion of each of the support posts 212, 212 to extend sideways obliquely and downwardly, and a leg 215 is provided between an intermediate portion of each of the support arms 214, 214 and the base plate 211. The water tank 202 is disposed on and fixed to the support arms 214, 214. The water tank 202 is formed into a box shape with its upper portion opened, and water is contained in the water tank, so that the catalytic converter is submerged in the water to visually check any leakage of air from the casing 1.

A bottom of the water tank 202 is partially notched and a light-shielding plate 216 made of a synthetic resin and having a light shielding property is secured to the bottom of the water tank 202 to close such notch. An illuminating light 217 is disposed below the light shielding plate 216 for illuminating the interior of the water tank 202 through the light shielding plate 216 and supported on the support plate 218 which is mounted to extend between the support arms 214, 214.

A bracket 219 extending in the same direction as a direction of extension of the support arms 214, 214 is secured to the connecting plate 213 connecting the upper ends of the support frame, i.e., the upper ends of the support posts 212, 212, and the lift stand 203 is liftably supported by the bracket 219. More specifically, the lift stand 203 is disposed below the bracket 219, and a pair of cylindrical guides 220, 220 and a lifting cylinder 221 mounted in the middle of the cylindrical guides 220, 220 are fixed to the bracket 219 and each have a vertical axis. A pair of guide rods 222, 222 secured to the lift stand 203 and each having a vertical axis are slidably received in the cylindrical guides 220, 220, respectively, and a piston rod 221a in the lifting cylinder 221 is connected to the lift stand 203. Accordingly, the lift stand 203 can be raised and lowered above the water tank 202 by the expansion and contraction of the lifting cylinder 221.

Obliquely and downwardly extending arms 223a and 223b are secured to a lower portion of the light stand 203 at a locations spaced apart from each other, and cylindrical bearing members 224a and 224b are coaxially secured to leading ends of the arms 223a and 223b. A rotary shaft 225 is rotatably carried on one of the bearing members 224a, while an urging rod 206 is carried on the other bearing member 224b for axial movement and for rotation about an axis. The rotary shaft 225 and the urging rod 206 coaxially pass through the bearing members 224a and 224b, and a receiving jig 204 is secured to that end of the rotary shaft 225 which is closer to the bearing member 224b.

The receiving jig 204 is formed so that the catalytic coverter C can be substantially horizontally placed thereon. A seal pad 205 is fixed to the receiving jig 204 and capable of abutting against the flange 3a (see FIG. 1) to close the opening 6 (see FIG. 1) at one end of the catalytic converter C which has been placed on the receiving jig 204.

In this manner, the receiving jig 204 is carried on the lift stand 203 for rotation about a horizontal axis, so that the catalytic converter C can be substantially horizontally placed onto the receiving jig 204.

On the other hand, a seal pad 207 is fixed to an end of the urging rod 206 closer to the bearing member 224a and is capable of abutting against the flange 3b (see FIG. 1) to close the opening 7 (see FIG. 1) at the other end of the catalytic converter C which has been placed on the receiving jig 204. The urging rod 206 is axially movable and when the urging rod 206 is moved toward the catalytic converter C on the receiving jig 204, the catalytic converter C on the receiving jig 204 is clamped between the coaxial rotary shaft 225 and urging rod 206 while closing the openings 6 and 7 by the seal pad 205 and 207.

Moreover, one of the seal pads 205 and the rotary shaft 225 are provided with air passages 226 which communicate with each other for permitting air to be supplied into the catalytic converter C closed and which are connected to a compressed air supply source 227.

The manually operating mechanism 208 comprises a rotary drive shaft 228 rotatably carried on the lift stand 203 and having an axis parallel to the rotary shaft 225 and the urging rod 206, an operating handle 229 fixed to one end of the rotary drive shaft 228, driving sprockets 230 and 231 secured to the rotary drive shaft 228, a driven sprocket 232 fixed to the rotary shaft 225 at a location corresponding to the driving sprocket 230, a driven sprocket 233 coupled to the urging rod 206 at a location corresponding to the driving sprocket 231 for permitted relative movement and for inhibited relative rotation, an endless chain 234 wrapped around the driving sprocket 230 and the driven sprocket 232, and an endless chain 235 wrapped around the driving sprocket 231 and the driven sprocket 223.

With such manually operating mechanism 208, a rotation of the operating handle causes a rotative power of the rotary drive shaft 228 to be synchronously transmitted to the rotary shaft 225 and the urging rod 206.

A driving means 236 is provided between the lift stand 203 and the urging rod 206 for axially reciprocally driving the urging rod 206. The driving means 236 comprises a connecting member 237 mounted at an end of the urging rod 206 for permitted relative rotation and for inhibited axial relative movement, a cylinder 238 disposed within the lift stand 203 and having an axis parallel to the urging rod 206, and a swingable link 239 connecting a piston rod 238a of the cylinder 238 and the connecting member 237.

An intermediate portion of the swingable link 239 is swingably carried by a bracket 240 mounted on an arm 223b integral with the lift stand 203, and the swingable link 239 is connected at one end thereof to a leading end of the piston rod 238a and at the other end thereof to the connecting member 237. Thus, the expansion of the cylinder 238 causes the urging rod 206 to be moved in a direction in which the seal pad 207 at its leading end comes close to the catalytic converter C on the receiving jig 204, and the contraction of the cylinder 238 causes the urging rod 206 to be moved in a direction in which the seal pad 207 at its leading end comes away from the catalytic converter C on the receiving jig 204.

A limit switch 241 is disposed on the lift stand 203 for detecting the position of the piston rod 238a in the cylinder 238 when the seal pad 207 has been urged against the catalytic converter C on the receiving jig 204, so that the cylinder 238 is expanded until the piston rod 238a is detected by the limit switch 241.

A water reservoir 242 is mounted on the base plate 211 of the support frame 201, and a water supply pipe 244 including an on-off valve 243 is connected to the water reservoir 242. The water supply pipe 244 is connected to a water supply source which is not shown. A pump 245 is placed on the water reservoir 242 for pumping water in the water reservoir 242, and a water supply pipe 246 connected to a discharge port in the pump 245 is connected to an upper portion of the water tank 202. A water discharge pipe 247 is connected to a bottom of the water tank 202, and an on-off valve which is not shown is disposed midway of the water discharge pipe 247.

The operation of the air-tightness inspecting device 15 will be described below. In inspecting the air tightness of the catalytic converter C, with the water tank 202 internally filled with water, the lift stand 203 is brought into a raised position and the cylinder 238 is contracted. Further, the receiving jig 204 is brought into an angularly displaced position about its axis in which the catalytic converter C can be horizontally placed thereon.

In this condition, the catalytic converter C to be inspected by a personnel is lifted and placed onto the receiving jig 204. When the urging rod 206 is then driven toward the catalytic converter C by the drive means 236, the catalytic converter C is clamped between the rotary shaft 225 and the urging rod 206 with the openings 6 and 7 closed by the seal pads 205 and 207. Then, a pressurized air from the compressed air supply source 227 is supplied through the air passage 226 into the catalytic converter C to pressurize the catalytic converter C.

Thereafter, when the lift stand 203 is lowered, the catalytic converter C on the receiving jig 204 is submerged into water in the water tank 202. When the catalytic converter C has been submerged in the water and if there is a defect in the welded portion of the casing 1 to cause a leakage of air, air bubbles are produced from an air-leaked portion, so that the air-leaked portion can be easily visually observed. Moreover, light from the illuminating lamp 217 passes from the below of the water tank 202 via the light shielding plate 216 into the water tank 202, thereby facilitating the finding of the air bubbles.

Further, by rotating the operating handle 229 with the catalytic converter C submerged in the water, the catalytic converter can be rotated in the water, and the leakage of air from the casing 1 can be easily inspected over the entire outer surface of the casing 1.

After completion of such an inspection of the air tightness, the lift stand 203 is raised to pull up the catalytic converter C out of the water and further, with the urging rod 206 moved away from the catalytic converter C by the drive means 236, the catalytic converter C can be removed from the receiving jig 204.

The works to be conducted by the personnel in the inspection of the air tightness of the cotalytic converter C in this manner are only the placement of the catalytic converter C onto the receiving jig 204 and the rotation of the handle 229 as well as the lowering of the catalytic converter C from the receiving jig 204. Therefore, it is possible to reduce the burden to the personnel to improve the efficiency of operation.

After completion of the inspection of the air tightness of the catalytic converter C by the air-tightness insepcting device 15, a number of production is stamped onto the catalytic converter C by the stamping device 16 disposed adjacent the air-tightness inspecting device 15.

Figure 24:
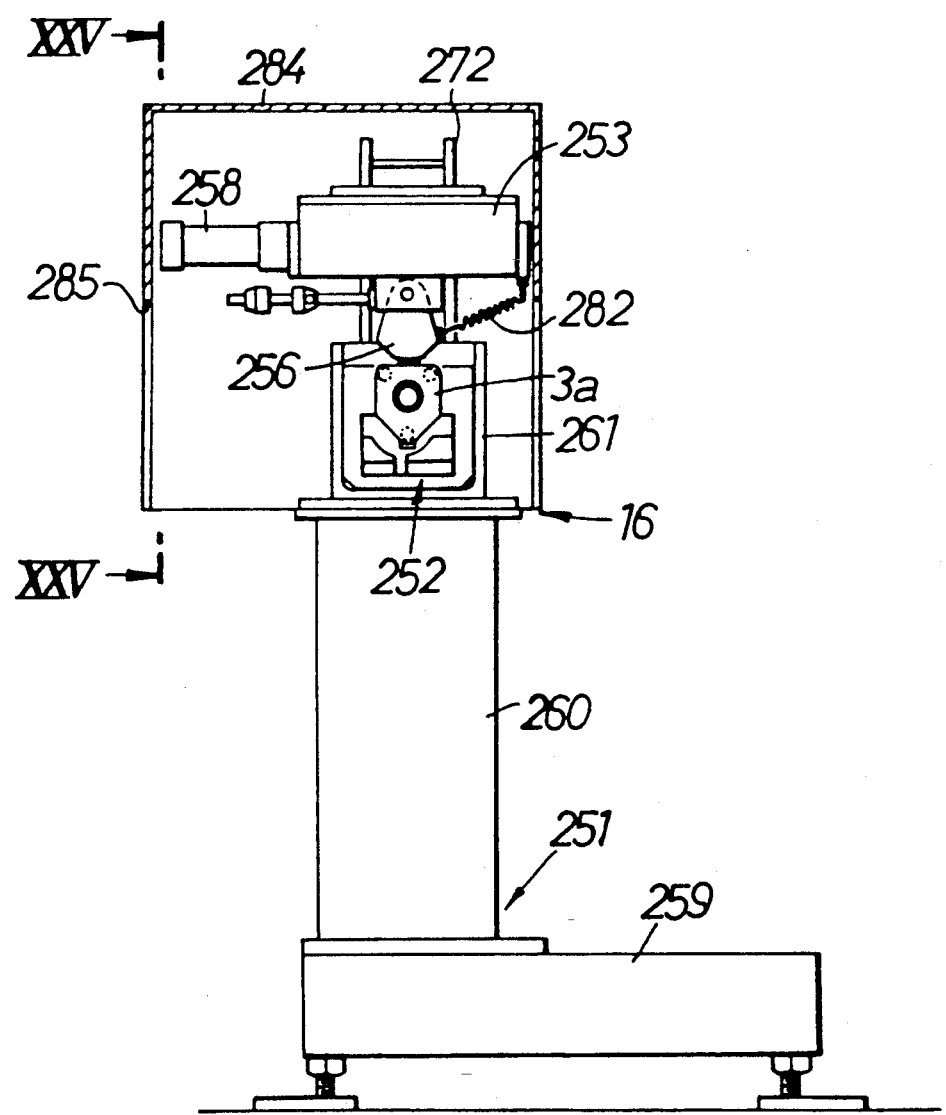
Figure 25:
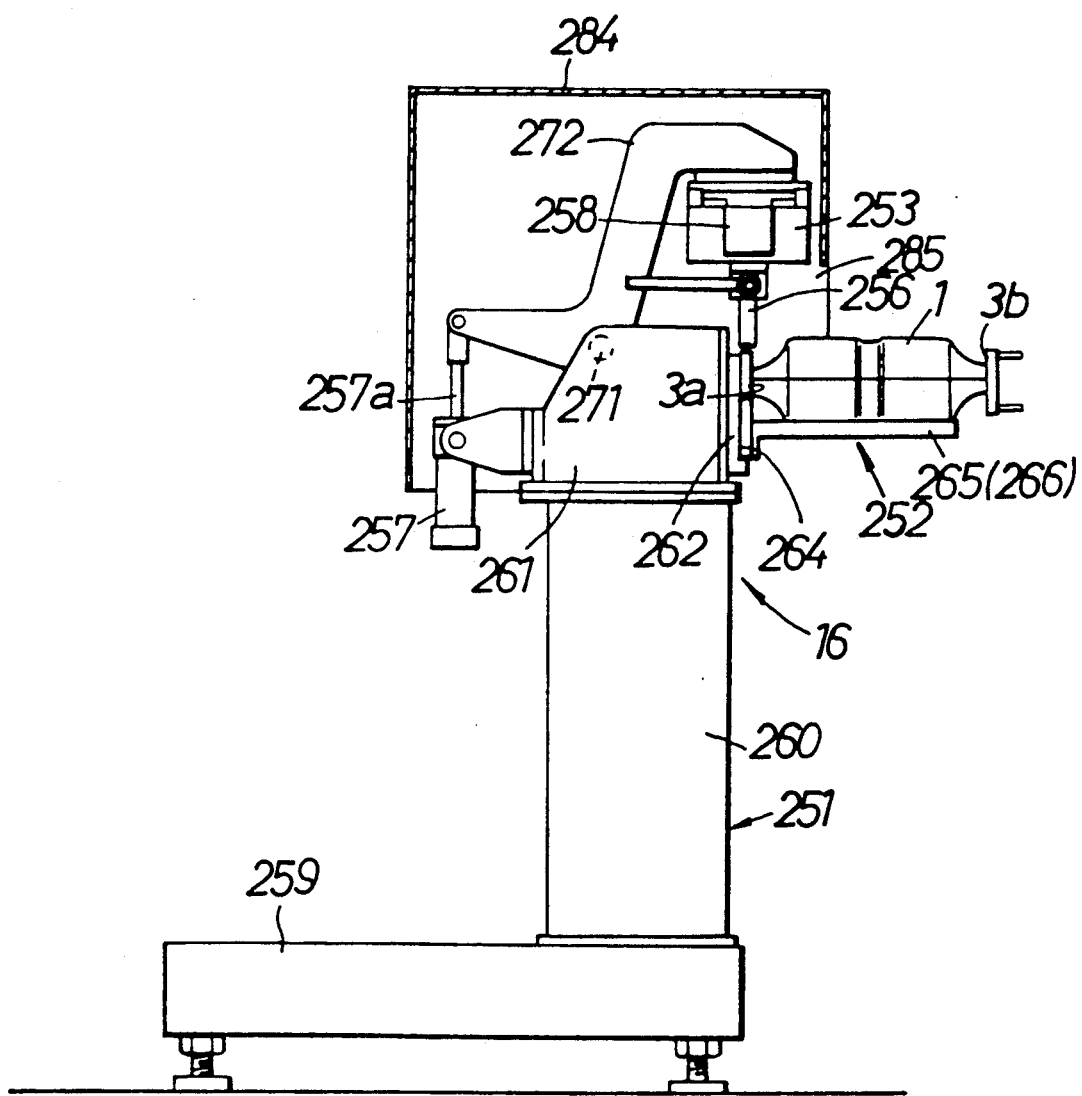
Figure 26:
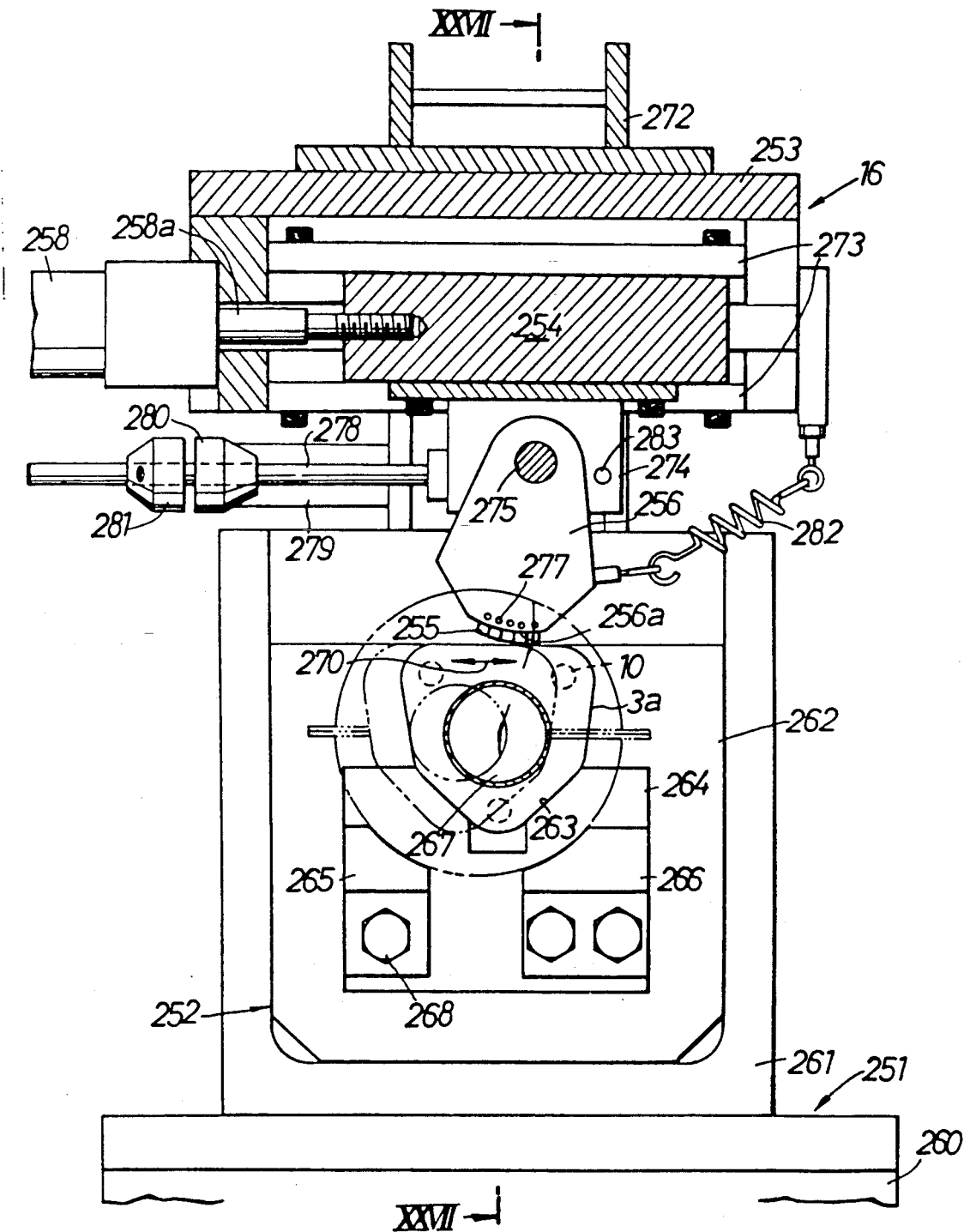
Figure 27:
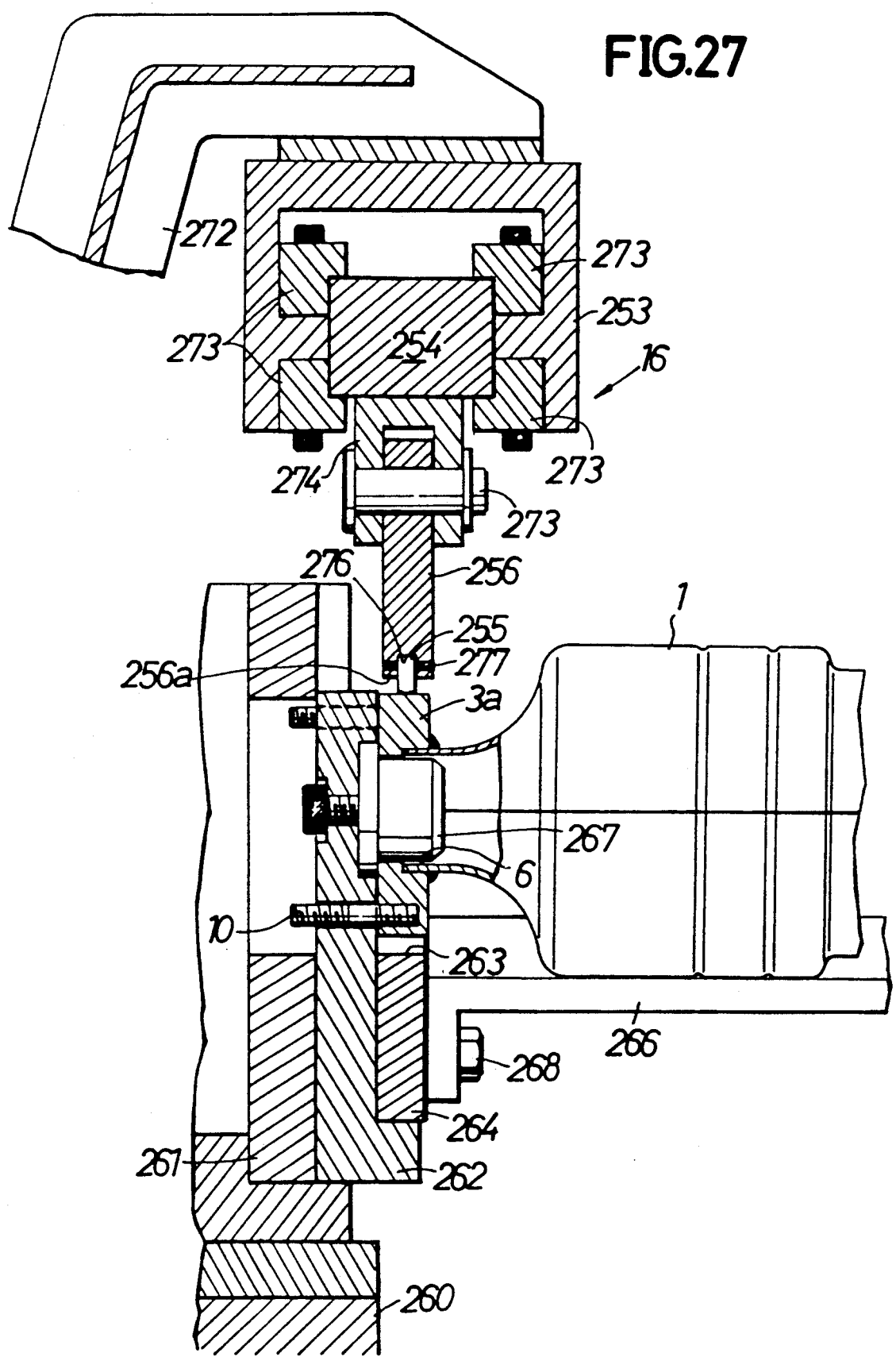
Figure 28:
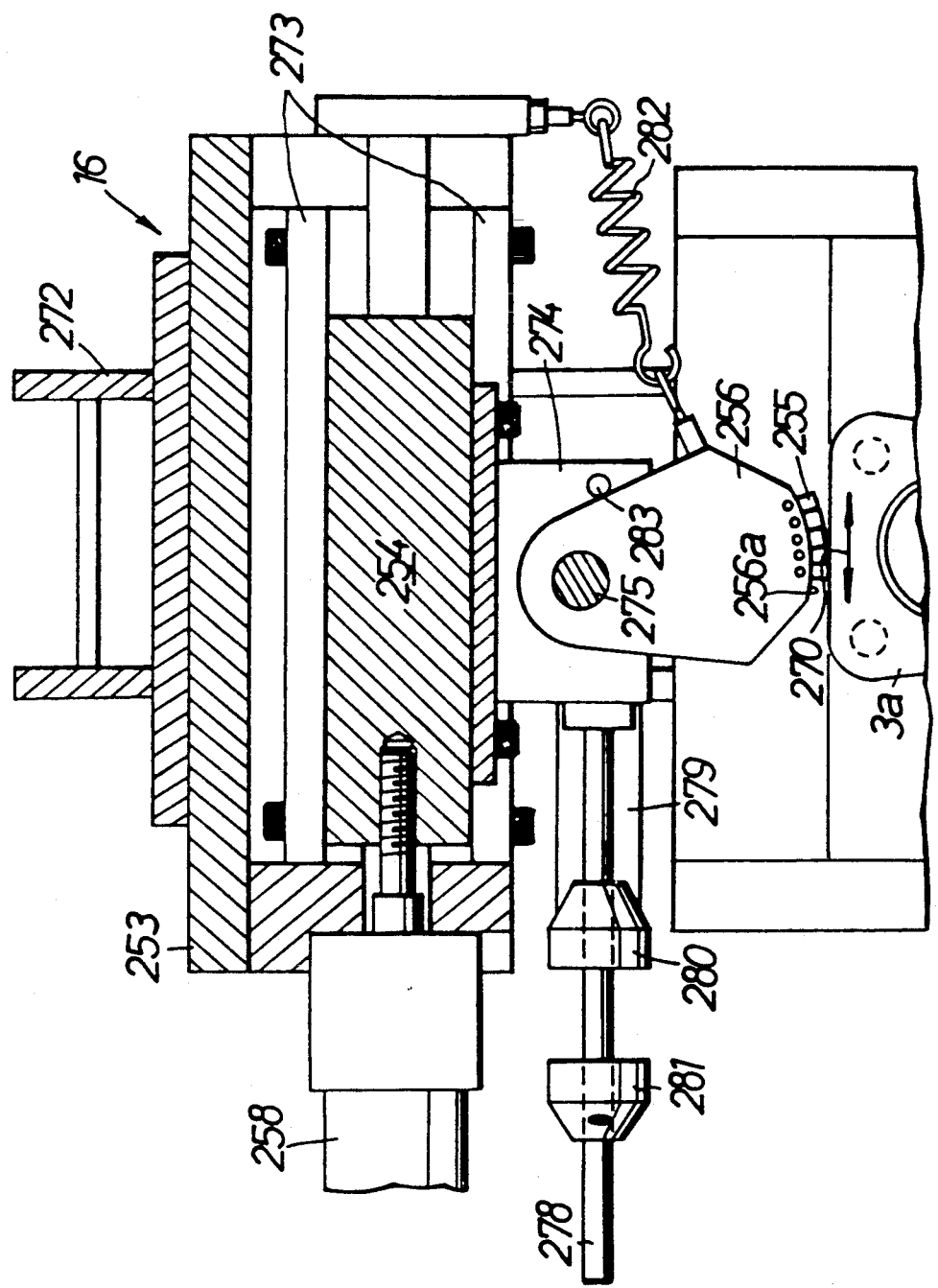

FIGS. 24 to 28 illustrate the stamping device, FIG. 24 being a front view in longitudinal section of the stamping device; FIG. 25 being a sectional view taken along a line XXV—XXV in FIG. 24; FIG. 26 being an enlarged view of essential portions shown in FIG. 24; FIG. 27 being a sectional view taken along a line XXVII—XXVII in FIG. 26; and FIG. 28 is a sectional view illustrating an operative state different from FIG. 26.

The stamping device 16 comprises a support stand 251 fixedly disposed on the floor surface, a receiving jig 252 fixed to the support stand 251, a movable frame 253 swingably carried on the support stand 251 above the receiving jig 252, a slider 254 carried on the movable frame 253, a printing-type holder 256 carried on the slider 254 and having a plurality of printing types 255 detachably mounted thereon, a movable frame cylinder 257 connected to the movable frame 253, and a slider cylinder 258 connected to the slider 254, so that a number of production or the like is stamped onto the flange 3a mounted at one end of the casing 1 in the catalytic converter C.

The support stand 251 is comprised of a horizontal base plate 259 fixedly disposed on the floor surface, a support post 260 rised on the base plate 259, and a support block 261 fixed to an upper portion of the support post 260.

The receiving jig 252 is fixed to a side of the support block 261 of the support stand 251 and comprises an abutment plate 262 fixed to a side of the support block 261 to abut against the flange 3a at the one end of the casing 1 in the catalytic converter C, a carrier plate 264 fixed to the abutment plate 262 and having in its upper surface a substantially V-shaped carrying groove 263 adapted for placement of the flange 3a therein with its outer surface to be stamped being directed upwardly, a pair of support plates 265 and 266 extending outwardly from the carrier plate 264 and formed into a shape corresponding to a shape of the lower portion of the casing 1 to horizontally support the casing 1 with its flange 3a placed in the groove 263, and a positioning pin 267 fixed to the abutment plate 262 and adapted to be inserted into the opening 6 in the casing 1. The support plates 265 and 266 are fixed, together with the carrier plate 264 and the abutment plate 262, to the support block 261 by a bolt 268, so that the receiving jig 252 is detachably fixed to the support block 261 by the bolt 268. The abutment plate 262 is provided with three insert holes 269 through which are inserted the three bolts 10 embedded in the flange, respectively.

The movable frame 253 is vertically movably disposed above the flange 3a at one end of the catalytic converter C placed on the receiving jig 252 and is secured to one end of a swingable arm 272 which is carried on the block 261 by a shaft 272 parallel to a direction 270 of arrangement of printed letters on the outer surface of the flange 3a. The movable frame cylinder 257 is supported on the support block 261 to have a vertical axis, and a piston rod 257a of the cylinder 257 is connected to the other end of the swingale arm 272. This ensures that the swingable arm 272 is swung in response to the expansion and contraction of the movable frame cylinder 257, and in response to this swinging movement, the movable frame 253 is raised and lowered.

The slider 254 is formed into a rectangular pillar-like shape with a rectangular section and carried on the movable frame 253 for movement in the direction 270 of arrangement of printed letters. More specifically, four guide rails 273 - - -are secured to the movable frame 253 to extend in the direction 270 of arrangement of printed letters and is substantially L-shaped so as to be slidably fitted on four corners in the slider 254, so that the slider 254 is guided by the guide rails 273 - - - to move in the direction 270 of arrangement of printed letters.

A bracket 274 is secured to a lower portion of the slider 254, and the printing-type holder 256 is carried on the bracket 274 for swinging movement about a horizontal axis perpendicular to the direction 270 of arrangement of printed letters. The printing-type holder 256 is basically fan-shaped and disposed with a portion corresponding to an essential portion of such fan shape being upward. An upper portion of the printing-type holder 256 is carried on the bracket 274 by a horizontal support shaft 275 perpendicular to the direction 270 of arrangement of printed letters.

A lower surface 256a of the printing-type holder 256 is formed into an arc shape about the support shaft 275, and the plaurality of printing types 255 for stamping letters onto the outer surface of the flange 3a are detachably mounted on the lower surface 256a in the direction 270 of arrangement of printed letters. More specifically, the lower surface 256a of the printing-type holder 256 is provided with a mounted groove 276 longer in the direction 270 of arrangement of printed letters. Each of the pringting types 255 is inserted into the mounting groove 276 and fixed to the printing-type holder 256 by a threaded member 277.

The slider cylinder 258 is supported on the movable frame 253 to have an axis parallel to a direction of movement of the slider 254, i.e., the direction 270 of arrangement of printed letters, and a piston rod 258a of the slider cylinder 258 is connected to the slider 254. Thus, the slider 254 can be reciprocally moved in the direction of arrangement of printed letters in response to the expansion and contraction of the slider cylinder 258.

A guide rod 278 is secured at its base end to the bracket 274 to extend in the direction 270 of arrangement of printed letters. On the other hand, a guide member 280 is slidably fitted over the guide rod 278 and secured to a leading end of a support arm 279 which is secured at its base end to the movable frame 253 or the swingable arm 272. Thus, the bracket 274 can be also moved in response to the movement of the slider 254 in such a manner to cause the guide member 280 to guide the guide rod 278. Moreover, a stopper 281 is secured to the guide rod 278 and abuttable against the guide member 280 to regulate the maximum moved position of the slider 254 when the slider cylinder 258 is operated in an expanding direction.

A spring 282 is mounted in a compressed manner between the movable frame 253 and the printing-type holder 256, so that the printing-type holder 256 is biased to rotate in a counterclockwise direction as viewed in FIG. 26 about the support shaft 275 by a spring force of the spring 282. A stopper pin 283 is embedded in the bracket 274 and abuttable against the printing-type holder 256 to regulate the rotated position of the printing-type holder 256 by the spring force of the spring 282. The position of disposition of the stopper pin 283 is determined so that with the printing-type holder 256 abutting against the stopper pin 283, each of the printing types 255 mounted on the the printing-type holder 256 is in a lower position.

A covver 284 is secured to an upper end of the support post 260 in the support stand 251 for covering the support block 261, the receiving jig 252, the movable frame 253, the slider 254, the printing-type holder 256, the movable frame cylinder 257 and the slider cylinder 258. The cover 284 is provided with an opening 285 which permits the placement and removal of the catalytic converter C onto and from the receiving jig 252.

In stamping a number of production or the like onto the flange 3a at one end of the catalytic conveter C by the stamping device 16, the movable frame 253, with required printing types 255 mounted on the printing-type holder 256, is first raised, and the catalytic converter C is positioned and placed onto the receiving jig 252. Particularly, the catalytic converter C is disposed so that the flange 3a is placed in the carrying groove 263 with its outer surface to be stamped being directed upwardly.

Then, the movable frame cylinder 257 is expanded to lower the movable frame 253. In this case, if the slider cylinder has been contracted, the printing-type holder 256 is in abutment against the stopper pin 283, as shown in FIG. 28, and in this condition, the printing types 255 mounted on the lower surface 256a of the printing-type holder 256 is pressed against the outer surface of the flange 3a.

Then, when the sllider cylinder 258 is expanded to move slider 254 in the direction 270 of arrangment printed letters. This causes the printing-type holder 256 to be swung about the support shaft 275 against the spring force of the spring 282, permitting the individual printing types 255 to be sequentially pressed onto the outer surface of the flange 3a. Consequently, a required number of production or the like is sequentially stamped onto the outer surface of the flange 3a.

In this manner, the printing types 255 are sequentially rolled in a pressed condition to provide a stamp on the flange 3a, so that the generation of any shock noise can be avoided.

After completion of the stamping operation, the movable frame 253 is raised and the slider 254 is returned to the original position. In this condition, the catalytic converter C may be removed from the receiving jig 252.

In such stamping device 16, the receiving jig 252 is detachably mounted on the support block 261 and, by replacing this receiving hig 252 by an alternative receiving jig 252 corresponding to a different type of a catalytic converter C, it is possible to conduct the stamping on a plurality of catalytic converters C.

The catalytic converter C with a stamp provided thereon by the stamping device 16 is transported out as a completed product on the fifth transporting device 21.

The catalytic converter C is assembled via a series of steps as described above, and the steps are summarized as follows: The catalytic converter C is assembled in sequence via a step of wrapping the seal member 9 and the peripheral surface protecting member 8 around the catalyst to prepare the insert component assembly 86 in the insert component assembling device 11; a step of disposing the pair of casing halves 1a and 1b so that their inner surfaces are opposed to each other, positioning and disposing the insert component assembly 86 within one of the casing halves 1a and in this condition, bringing the other casing half 1b closer to the one casing half 1a to welding weld portions of the casing halves 1a and 1b to assemble the casing 1 in the casing temporarily welding device 12 and the casing welding device 13, a step of fitting the flanges 3a and 3b, while positioning them, over the opposite ends of the casing 1 dispoed vertically and then welding the opposite ends of the casing 1 and the flanges 3a and 3b while rotating the casing 1 about the horizontal axis to bring the fitted portions of the opposite ends of the casing 1 and the flanges 3a and 3b to the substantially same position in the flange welding device 14; a step of closing the opposite ends after welding of the falnges 3a and 3b to the opposite ends of the casing 1 and then immersing the casing 1 while pressurizing the interior of the casing 1 to inspect the air tightness of the casing 1 in the air-tightness inspecting device 15; and a step of stamping a number of production or the like onto the flange 3a in the stamping device 16. The above steps are carried out in the mentioned order consecutively.

In this way, the catalytic converter C is assembled through the consistent assembling steps and therefore, it is possible to exactly effect a control of the steps to provide an increased quality and an increased efficiency of operation.

What is claimed is:

1. An apparatus for assembling a catalytic converter which includes a columnar catalyst contained in a cylindrical casing with a seal member and a peripheral surface protecting member interposed between the catalyst and an inner surface of the casing, said casing including a pair of axially divided casing halves welded to each other and including flanges welded at radial opposite sides of the casing, said apparatus having a casing assembling device, said casing assembling device comprising:

a stationary receiving stand which is disposed in position in a manner replaceable with another type of stand and onto which one of said casing halves is placed with an inner surface thereof directed upwardly;

a positioning member movable along a longitudinal axis of the catalyst for determining a position of the catalyst within said one casing half and between a position in which an end face of the catalyst abuts against the positioning member within the casing on the stationary receiving stand and a position outside of the casing;

a lift bearer capable of holding the other casing half with an inner surface thereof directed downwardly and liftable above the stationary receiving stand, said lift bearer being replaceable with another type of bearer; and welding machines disposed on the stationary receiving stand on the radial opposite sides of the casing and movable relative to said stand for effecting welding to said flanges at the opposite ends of the casing when the welding machine is moved close to the casing halves.

2. An apparatus for assembling a catalytic converter according to claim 1, wherein said stationary receiving stand is detachably fixed to a stationary support stand, and said lift bearer is detachably fixed to a lift stand liftable above said support stand.

3. An apparatus for assembling a catalytic converter according to claim 1, wherein said catalyst comprises two separate parts which are assembled into the casing and said positioning member comprises two members which are disposed at an axial distance therebetween so as to be associated with opposed ends of the two parts of catalysts from axially outside, respectively.

* * * * *

UNITED STATES PATENT AND TRADEMARK OFFICE
CERTIFICATE OF CORRECTION

PATENT NO. : 5,105,516

DATED : April 21, 1992

INVENTOR(S) : Masayuki Enomoto et al

It is certified that error appears in the above-indentified patent and that said Letters Patent is hereby corrected as shown below:

On the cover page, Item [30], first line, "March 23, 1989" should read -- August 23, 1989 --.

Signed and Sealed this

Twenty-fourth Day of August, 1993

Attest:

BRUCE LEHMAN

*Attesting Officer*          *Commissioner of Patents and Trademarks*